US008841998B2

(12) United States Patent
Yamada et al.

(10) Patent No.: US 8,841,998 B2
(45) Date of Patent: Sep. 23, 2014

(54) ON-VEHICLE DISPLAY DEVICE

(75) Inventors: Yoshihisa Yamada, Shimada (JP); Kenichirou Kawamura, Shimada (JP); Shuichi Ishibashi, Shimada (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 13/643,719

(22) PCT Filed: May 25, 2011

(86) PCT No.: PCT/JP2011/062555
§ 371 (c)(1),
(2), (4) Date: Oct. 26, 2012

(87) PCT Pub. No.: WO2011/149107
PCT Pub. Date: Dec. 1, 2011

(65) Prior Publication Data
US 2013/0038434 A1    Feb. 14, 2013

(30) Foreign Application Priority Data
May 28, 2010    (JP) .................. 2010-123090

(51) Int. Cl.
*B60Q 1/00*    (2006.01)
*B60K 37/06*    (2006.01)
(52) U.S. Cl.
CPC ..................... *B60K 37/06* (2013.01)
USPC .......... 340/461; 340/425.5; 340/438
(58) Field of Classification Search
USPC ............. 340/438, 439, 995.27, 461, 425.5; 701/22, 48; 353/14; 345/173
See application file for complete search history.

(56) References Cited

U.S. PATENT DOCUMENTS

| 6,373,472 B1* | 4/2002 | Palalau et al. .............. 345/173 |
| 7,683,771 B1* | 3/2010 | Loeb ............................ 340/461 |
| 8,406,961 B2* | 3/2013 | Pathak et al. ................ 701/48 |
| 2005/0001714 A1* | 1/2005 | Amari ..................... 340/425.5 |
| 2007/0061068 A1 | 3/2007 | Okamoto et al. |

(Continued)

FOREIGN PATENT DOCUMENTS

| DE | 10339050 A1 | 3/2005 |
| EP | 1762419 A1 | 3/2007 |

(Continued)

OTHER PUBLICATIONS

International Search Report (PCT/ISA/210), dated Sep. 13, 2011, issued by the International Searching Authority in corresponding International Application No. PCT/JP2011/062555.

(Continued)

*Primary Examiner* — Brent Swarthout
(74) *Attorney, Agent, or Firm* — Sughrue Mion, PLLC

(57) ABSTRACT

An on-vehicle display device includes a first display section provided in an area within a width of a steering wheel of a vehicle viewed from a driver sitting on a driver seat of the vehicle and which displays at least one piece of report information concerning a state of the vehicle, a second display section provided in an area outside the width of the steering wheel viewed from the driver and which displays an image, and a control section which controls displays of the first display section and the second display section respectively. When a piece of report information is displayed on the first display section, the control section controls to display an information image corresponding to the piece of report information on the second display section.

3 Claims, 15 Drawing Sheets

(56) References Cited

U.S. PATENT DOCUMENTS

2008/0158510 A1* 7/2008 Tant et al. .................. 353/14
2010/0220250 A1* 9/2010 Vanderwall et al. .......... 348/837
2010/0273547 A1* 10/2010 Stasi et al. .................. 463/16

FOREIGN PATENT DOCUMENTS

| JP | 04-168413 A | 6/1992 |
| JP | 08-268114 A | 10/1996 |
| JP | 2007-062516 A | 3/2007 |
| JP | 2008-1120 A | 1/2008 |

OTHER PUBLICATIONS

Communication from the Japanese Patent Office dated Dec. 10, 2013, in a counterpart Japanese application No. 2010-123090.
International Search Report Form PCT/ISA/237 for Application PCT/JP2011/062555; dated May 25, 2011.

* cited by examiner

ON-VEHICLE DISPLAY DEVICE

TECHNICAL FIELD

This invention relates to an on-vehicle display device for displaying report information concerning the state of a vehicle.

BACKGROUND ART

Conventionally, an on-vehicle display device described in PTL 1 is proposed as an on-vehicle display device for displaying information concerning the state of a vehicle. This on-vehicle display device includes a center display for displaying information concerning the state of a vehicle such as vehicle speed and sub-displays for displaying information which is different from the information displayed on the center display.

The sub-displays are made up of a right display and a left display. The right display displays information concerning a state in which a preceding vehicle is detected and the detected vehicle is followed, etc., and the left display displays a map indicating the place where the vehicle exists at present, etc.

Icons corresponding to the display states of the right display and the left display are displayed on the center display together with the vehicle information concerning vehicle speed, etc., thereby informing a driver of the display states of the right display and the left display.

When the display states of the right display and the left display are changed, the icons displayed on the center display blink, so that the driver can check whether or not the display states of the right display and the left display are changed by visually recognizing the display state of the icons.

CITATION LIST

Patent Literature
[PTL 1] JP-A-2008-001120

SUMMARY OF INVENTION

Technical Problem

However, in the on-vehicle display device, if report information concerning the state of the vehicle is displayed on the center display, the sub-display displays information different from the information which is displayed on the center display and thus there is a problem in that the report information displayed on the center display is hard to recognize.

In the vehicle display, unless the icons displayed on the center display are directly viewed, the report information concerning the state of the vehicle cannot be checked. Thus, there is a problem in that the number of times the driver moves a line of sight between the center display and the sub-display increases.

It is therefore an object of the invention to provide an on-vehicle display device for making it possible to decrease the number of times that a driver's line of sight moves between the center display and the sub-display and enhance recognition of the description of report information.

Solution to Problem

In order to achieve the above object, according to the present invention, there is provided an on-vehicle display device comprising:

a first display section provided in an area within a width of a steering wheel of a vehicle viewed from a driver sitting on a driver seat of the vehicle and which displays at least one piece of report information concerning a state of the vehicle;

a second display section provided in an area outside the width of the steering wheel viewed from the driver and which displays an image; and a control section which controls displays of the first display section and the second display section respectively, wherein when a piece of report information is displayed on the first display section, the control section controls to display an information image corresponding to the piece of report information on the second display section.

According to the above configuration, when the report information is displayed on the first display section, the information image corresponding to the report information is displayed on the second display section provided in the area outside the width of the steering wheel. Thus, if a driver's line of sight is forward during driving of the vehicle, the information image comes within sight of the driver and the driver can recognize the description of the report information without moving the line of sight to the first display section. Therefore, there can be provided the on-vehicle display device for making it possible to decrease the number of times the driver's line of sight moves and enhance recognition of the description of report information.

Preferably, display times for displaying the information image on the second display section are associated with respective types of the report information, and when the piece of report information is displayed on the first display section, the control section controls to display the information image corresponding to the piece of report information on the second display section until the display time associated with the type of the piece of report information has elapsed.

According to the above configuration, when the report information is displayed on the first display section, the information image is displayed on the second display section until the expiration of the display time corresponding to the report information. Thus, for example, the information image corresponding to the report information of high importance is displayed relatively long, whereby the description the report information of high importance can be easily recognized.

Preferably, when a piece of report information is displayed on the first display section, the control section controls to scale up information image data corresponding to the piece of report information and display an information image corresponding to the scaled-up information image data on the second display section until a predetermined time has elapsed.

According to the above configuration, when report information is displayed on the first display section, the information image is scaled up and displayed on the second display section until the expiration of the predetermined time. Thus, the information image easily comes within sight of the driver and the driver can recognize that the information image is displayed on the second display section without moving a line of sight.

Preferably, predetermined times are associated with respective types of the report information, and when the piece of report information is displayed on the first display section, the control section controls to display the information image corresponding to the scaled-up information image on the second display section until the predetermined time associated with the type of the piece of report information has elapsed.

According to the above configuration, when report information is displayed on the first display section, the information image is scaled up and displayed on the second display section until the expiration of the predetermined time corresponding to the report information. Thus, for example, the information image corresponding to the report information of high importance is scaled up and displayed for a relatively long time, whereby the report information of high importance easily comes within sight of the driver.

Preferably, different display colors are associated with respective types of the report information, and when the piece of report information is displayed on the first display section, the control section controls to display the information image corresponding to the piece of report information and a background of the information image in the display color associated with the type of the piece of report information on the second display section.

According to the above configuration, when report information is displayed on the first display section, the background of the information image is displayed on the second display section in the display color corresponding to the report information. Thus, the display color comes within sight of the driver, whereby the driver can recognize the type of information image displayed on the second display section.

Preferably, when no report information is displayed on the first display section, the control section controls to display a plurality of icon images on the second display section. Also, the on-vehicle display device further comprises:

a cursor key for recognizing one of the plurality of icon images; and a selection key for selecting the recognized icon image, wherein different display colors are associated with the plurality of icon images respectively; and wherein when the one of the icon images is recognized by receiving a signal from the cursor key, the control section controls to display a background of the plurality of icon images in a menu screen on the second display section in the display color corresponding to the recognized icon image.

According to the above configuration, when report information is not displayed on the first display section, the background is displayed on the second display section in the display color of the icon image recognized by operating the cursor key. Thus, the display color comes within sight of the driver, whereby the driver can recognize the type of icon image recognized by operating the cursor key without directly viewing the second display section.

Preferably, no report information is displayed on the first display section, the image display control section controls to display a plurality of icon images on the second display section. Also, the on-vehicle display device further comprises:

a cursor key for recognizing one of the plurality of icon images; and a selection key for selecting the recognized icon image, wherein different moving images are associated with the plurality of icon images respectively; and wherein when the one of the icon images is recognized by receiving a signal from the cursor key, the control section controls to display the moving image associated with the recognized icon image on a moving image display area provided on the periphery of the recognized one of the icon images.

According to the above configuration, when report information is not displayed on the first display section, the moving image is displayed on the second display section on the periphery of the icon image recognized by operating the cursor key. Thus, the moving image comes within sight of the driver, whereby the driver can more easily recognize the type of icon image recognized by operating the cursor key without directly viewing the second display section.

Preferably, the first display section and the second display section are integrally formed in one body, and the second display section has an image display area for displaying the information image or icon images and a guide display area provided between the first display section and the image display area for displaying a guide image for guiding a driver's line of sight to the image display area of the second display section.

According to the above configuration, the guide display area is provided between the first display section and the image display area, so that the guide display area comes within sight of the driver, whereby the driver's line of sight can be induced to the information image display area.

Advantageous Effects of Invention

The on-vehicle display device is extremely useful for decreasing the number of times a driver's line of sight moves and enhancing recognition of the description of the report information.

DESCRIPTION OF EMBODIMENTS

Figure 1:
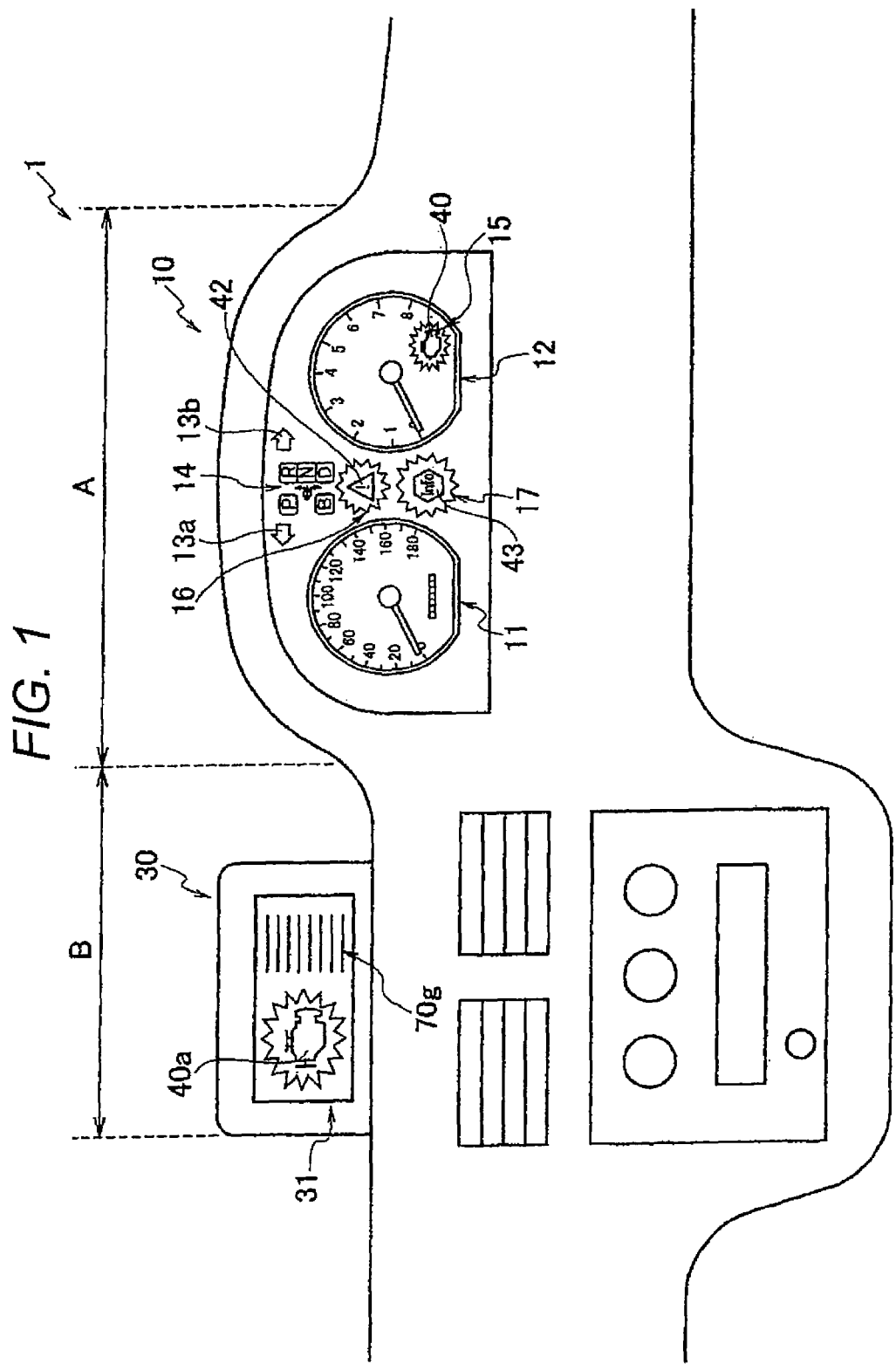
FIG. 1 is a drawing to show an on-vehicle display device according to a first embodiment of the invention.

A first embodiment of the invention will be discussed below with reference to the accompanying drawings: To begin with, an on-vehicle display device according to the first embodiment of the invention will be discussed with reference to FIG. 1. FIG. 1 is a drawing to show the on-vehicle display device according to the first embodiment of the invention.

As shown in FIG. 1, an on-vehicle display device includes a first display (first display section) 10 for displaying at least one piece of report information concerning the state of the vehicle (for example, warning, proposal, vehicle information, contents of interaction, etc.,) and a second display (second display section) 30 provided separately from the first display 10. The first display 10 and the second display 30 are implemented as liquid crystal displays.

As shown in FIG. 1, the first display 10 is provided in an area A in a width of a steering wheel (not shown) viewed from a driver sitting in a driver seat of the vehicle, and the second display 30 is provided above the position where the first display 10 is provided (front glass side) and in an area B outside the width of the steering wheel viewed from the driver.

Thus, the second display 30 is provided in the area B outside the width of the steering wheel (not shown), whereby an image displayed on the second display 30 is not hidden by the steering wheel. If the line of sight of the driver is ahead during running of the vehicle, the second display 30 is within sight of the driver, whereby the driver can recognize the image displayed on the second display 30 without moving a driver's sight of view. Therefore, the on-vehicle display device for decreasing the number of times that the driver moves a line of sight between the first display 10 and the second display 30 and enabling the driver to recognize the description of report information can be provided.

The first display 10 for displaying the report information concerning the state of the vehicle has a speed meter 11 for displaying traveling speed of the vehicle, a tachometer 12 for displaying the number of revolutions of an engine, a direction indication part 13a of a right winker and a direction indication part 13b of a left winker provided above the speed meter 11 and the tachometer 12, and a shift indicator display part 14 provided between the speed meter 11 and the tachometer 12 for displaying the shift position of a transmission.

The first display 10 has a plurality of display parts for displaying report information concerning the state of the vehicle (for example, warning, proposal, vehicle information, contents of interaction, etc.,). Specifically, the first display 10 has a warning and alarm display part 15 for displaying a warning symbol 40 indicating a warning of an electronic control anomaly of the engine, etc., an alarm symbol 41 indicating an alarm of an air bag system anomaly (see FIGS. 10A to 10D), a master caution display part 16 for displaying a master caution symbol 42 indicating occurrence of an anomaly in the vehicle when the warning symbol 40 or the alarm symbol 41 is displayed on the warning and alarm display part 15, and an indicator information display part 17 for displaying an indicator symbol (not shown) indicating a maintenance message of the vehicle, etc., and an information symbol 43 indicating information of the vehicle, etc.

The warning and alarm display part 15 displays the symbols 40, 41, 42, etc., corresponding to the types of warning, alarm, etc., concerning the state of the vehicle such as an electronic control anomaly of the engine, an air bag system anomaly, a half shut state of a door, and a seat belt wearing warning.

The second display 30 has an image display area 31 for displaying a predetermined image. When the warning symbol 40, the alarm symbol 41, the indicator symbol (not shown), or the information symbol 43 is displayed on the first display 10, the image display area 31 displays an information image corresponding to the report information. Specifically, any of a warning image corresponding to report information, an alarm image corresponding to alarm information, an interaction image indicating a maintenance image of the vehicle, etc., or a report image indicating information of the vehicle, etc.

For example, as shown in FIG. 1, if the warning symbol 40 indicating an electronic control anomaly of the engine is displayed on the warning and alarm display part 15 of the first display 10, a warning symbol 40a identical with the symbol displayed in the warning and alarm display part 15 and a text image 70g describing the report information (text describing that the anomaly is an electronic control anomaly of the engine, etc.,).

When the symbol 40, 41, or 43 is not displayed on the first display 10, the image display area 31 displays an icon image (see FIGS. 12A to 12D) for selecting an image displayed on the second display 30 and displays an image selected according to the icon image (for example, a back image of the vehicle picked up with a camera, a navigation image indicating the place where the vehicle exists at present and a road to the destination, etc.,).

Since an information image corresponding to the report information (see FIGS. 10A to 10D) is thus displayed in the image display area 31 of the second display 30, the descriptions of the warning symbol 40, the alarm symbol 41, etc., displayed on the warning and alarm display part 15 of the first display 10 can be grasped reliably.

Figure 2:
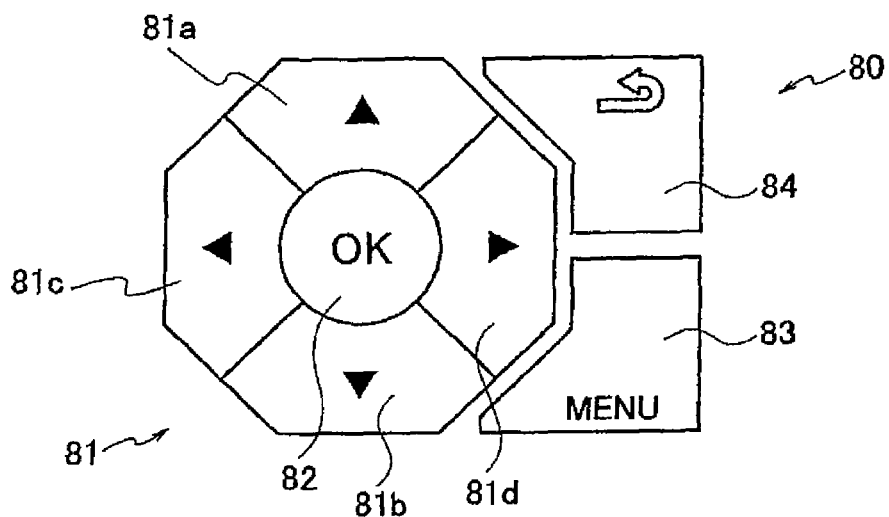
FIG. 2 is a drawing to show steering switches according to the first embodiment of the invention.

Next, steering switches according to the first embodiment of the invention will be discussed with reference to FIG. 2. FIG. 2 is a drawing to show the steering switches according to the first embodiment of the invention.

As shown in FIG. 2, the steering switches are made up of direction switches 81 (cursor keys), a determination switch 82 (selection key) provided at the center of the direction switches 81, and a menu switch 83 and a return switch 84 provided on one side of the direction switches 81 and the determination switch 82.

The direction switches 81 has an up switch 81a, a down switch 81b, a left switch 81c, and a right switch 81d and are switches operated to recognize an icon image displayed on the second display 30 (see FIGS. 12A to 12D), for example.

The determination switch 82 is a switch operated to determine an icon image selected by using the direction switch 81 (see FIGS. 12A to 12D). The menu switch 83 is a switch operated to display a plurality of icon images on the second display 30. The return switch 84 is a switch operated to return predetermined operation one step.

The steering switches 80 are provided in an area surrounded by the outer periphery of the steering wheel or in the proximity of the area. For example, when a back image of the vehicle is displayed on the second display 30, if the driver operates the menu switch 83 to display icon images (see FIGS. 12A to 12D), recognizes one icon image using the direction switch 81, and operates the determination switch 82, the image can be switched to a navigation image, etc.

Figure 3:
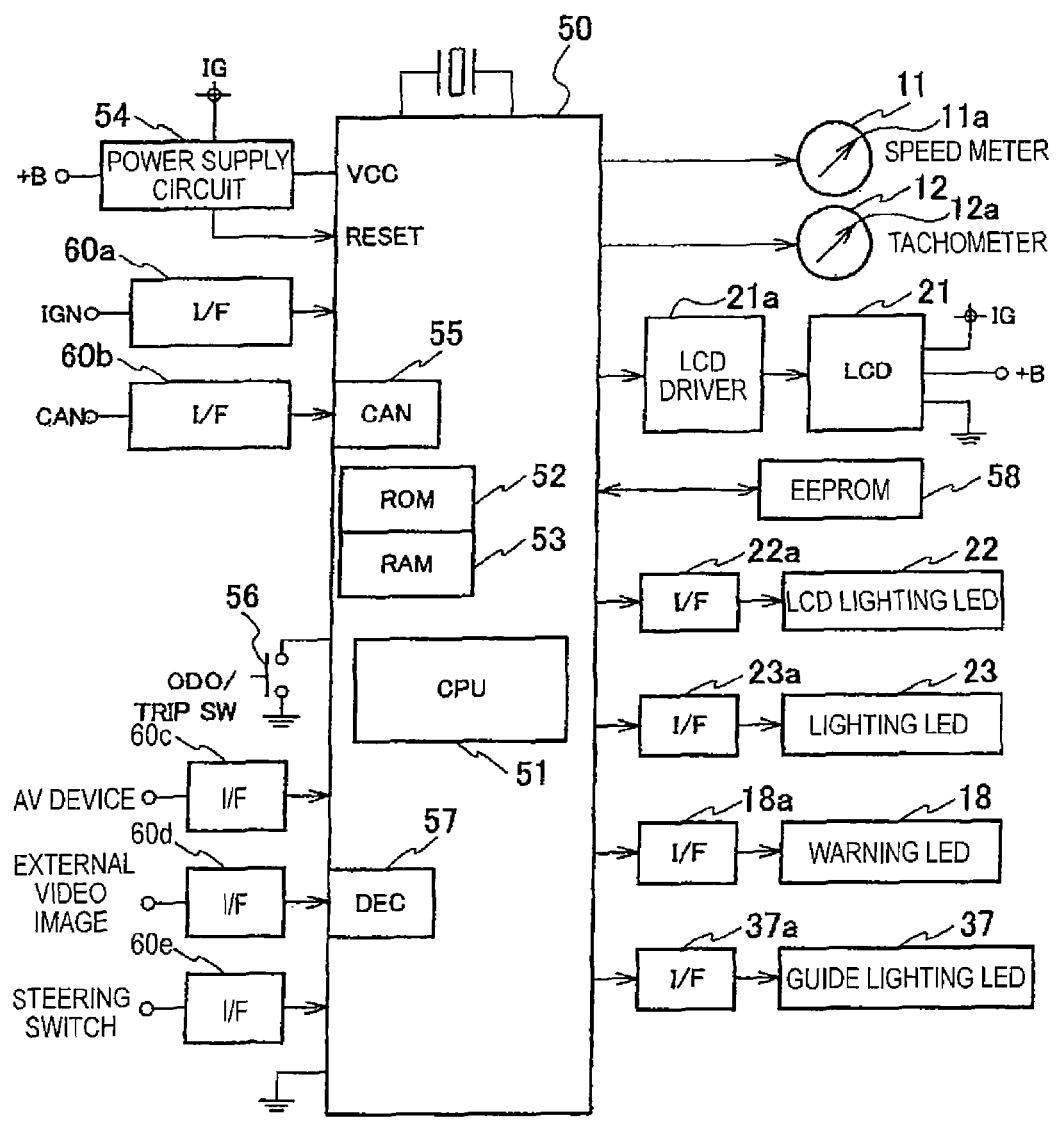
FIG. 3 is a block diagram to show the configuration of a circuit of the on-vehicle display device according to the first embodiment of the invention.

Next, the configuration of circuits of the on-vehicle display device 1 according to the first embodiment of the invention. FIG. 3 is a block diagram to show the configuration of a control circuit of the on-vehicle display device according to the first embodiment of the invention.

As shown in FIG. 3, a control circuit 50 (image display control section) has a CPU (Central Processing Unit) 51, ROM (Read-Only Memory) 52, and RAM (Random Access Memory) 53. The control circuit 50 is provided in the vehicle display 1.

The CPU 51 controls image display on the first display 10 and the second display 30, sound output to a loudspeaker (not shown), etc., based on signals output from various sensors provided in the vehicle.

The ROM 52 stores a control program executed by the CPU 51, image data displayed on the first display 10 and the second display 30, and the like. The RAM 53 stores various pieces of data of image data, sound data, etc., determined by executing the control program.

Connected to the control circuit 50 are a power supply circuit 54 connected to a battery for supplying an appropriate power supply voltage to the CPU 51, ignition (IGN) connected through an I/F (interface) 60*a* for generating a predetermined voltage, and a CAN (Control Area Network) connected through an I/F 60*b* for inputting various signals detecting the state of the vehicle. The various detection signals input through the I/F 60*b* (for example, signals indicating an electronic control anomaly of the engine, an anomaly of the air bag system, etc.,) are received in a CAN communication section 55.

The CPU 51 determines a warning signal and an alarm signal indicating an anomaly of the vehicle, an interaction signal indicating maintenance of the vehicle, etc., an information signal indicating information of the vehicle, etc., based on one or more signals received in the CAN communication section 55 and signals received within a predetermined time.

Also connected to the control circuit 50 are a switch 56 (SW) for resetting an odometer (ODO/TRIP) containing cumulative mileage of an odometer or a trip meter, an AV device connected through an I/F 60*c* for inputting a signal indicating audio information, etc., and external video connected through an I/F 60*d* for inputting a back image of a vehicle, etc., picked up with a camera installed outside the vehicle. A signal input from the external video is output to a DEC (decoder) 57.

Further, the steering switches (see FIG. 2) are connected to the control circuit 50 through an I/F 60*e*. When the direction switch 81, the determination switch 82, the menu switch 83, or the return switch is operated, a signal corresponding to the switch is input.

Further connected to the control circuit 50 are a speed meter 11, a tachometer 12, an LCD (Liquid Crystal Display) 21, EEPROM (Electrically Erasable and Programmable ROM) 58, an LCD lighting LED 22, a lightening LED 23, a warning LED 18, and a guide lighting LED 37.

Rotation of needles 11*a* and 12*a* of the speed meter 11 and the tachometer 12 is controlled based on a signal indicating the travel speed and a signal indicating rotation of the engine, received in the CAN communication section 55. Image data may be generated based on the signal indicating the travel speed and the signal indicating rotation of the engine and the generated image data may be displayed as an image on the first display 10 as the speed meter and the tachometer.

The LCD 21 is connected to the control circuit 50 through an LCD driver 21*a*. The LCD driver 21*a* inputs display signals of various pieces of information output from the CPU 51, performs drawing processing, etc., and outputs an image display signal to the LCD 21 of the on-vehicle display device 1.

The EEPROM 58 stores various pieces of data such as symbol display color pattern data defining the display color for each of the symbols displayed on the warning and alarm display part 15 and the indicator information display part 17 of the first display 10 (the warning symbol 40, the alarm symbol 41, the information symbol 43, etc.,), information image data defined corresponding to the symbols 40, 41, 43, etc., displayed on the first display 10, and background color pattern data defining a background color displayed on the second display 30 corresponding to each of the symbols displayed on the first display 10.

The LCD lighting LED 22 is connected to the control circuit 50 through an I/F 22*a* and the lighting LED 23 is connected to the control circuit 50 through an I/F 23*a*. The LCD lighting LED 22 and the lighting LED 23 are always lit while power is supplied to the on-vehicle display device 1.

The warning LED 18 is connected to the control circuit 50 through an I/F 18*a* and is lit or blinks in a display color corresponding to the state of the vehicle based on a signal indicating the state of the vehicle received in the CAN communication section 55, etc., (for example, a signal indicating an electronic control anomaly of the engine, an anomaly of the air bag system, etc.,).

The guide lighting LED 37 is connected to the control circuit 50 through an L/F 37*a* and lights a guide display area 33 of a vehicle display 1 according to a third embodiment described later in a display color corresponding to the symbol when the symbol (the warning symbol 40, the alarm symbol 41, the information symbol 43, etc.,) is displayed on the first display 10 based on a signal output from the control circuit 50.

Figure 4:
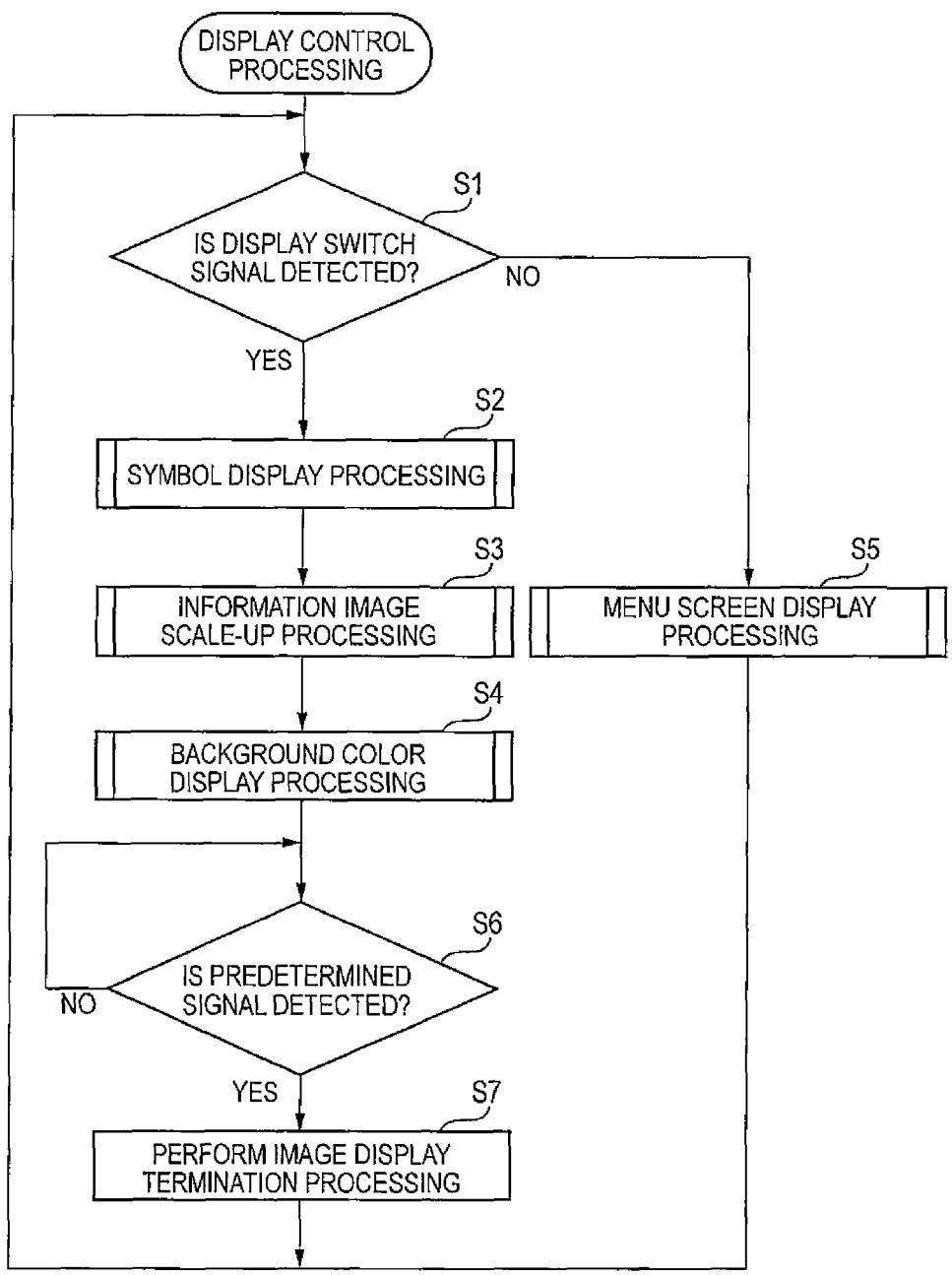
FIG. 4 is a flowchart of display control processing according to the first embodiment of the invention.

Next, the operation of the on-vehicle display device 1 according to the first embodiment of the invention will be discussed with reference to FIGS. 4 to 12. To begin with, display control processing of the CPU 51 according to the first embodiment of the invention will be discussed with reference to FIG. 4. FIG. 4 is a flowchart of the display control processing according to the first embodiment of the invention.

As shown in FIG. 4, the CPU 51 determines whether or not a display switch signal for switching display of the first display 10 and the second display 30 is received (step S1). That is, the CPU 51 determines whether or not a signal for displaying the symbol 40, 41, 43 and an information image on the first display 10 and the second display 30 is received based on a signal indicating the state of the vehicle received in the CAN communication section 55, etc., (for example, a signal indicating an electronic control anomaly of the engine, an anomaly of the air bag system, etc.,), whether or not a signal for displaying a back image of the vehicle, a navigation information image, etc., input from an AV device and external video is received.

When it is determined that the display switch signal is received (YES at step S1), the CPU 51 performs symbol display processing later described with reference to FIG. 5 (step S2). In this processing, an image corresponding to the display switch signal is displayed in the warning and alarm display part 15, the master caution display part 16, and the indicator information display part 17.

Next, the CPU 51 performs information image scale-up processing later described with reference to FIG. 6 (step S3). In this processing, an information image displayed in the information image display area 31 of the second display 30 is enlarged and displayed for the time corresponding to the display switch signal.

Next, the CPU 51 performs background color display processing later described with reference to FIG. 9 (step S4). In this processing, the background color of the information image display area 31 of the second display 30 is changed in a display color corresponding to the display switch signal.

On the other hand, when it is determined that the display switch signal is not received (NO at step S1), the CPU 51 performs menu screen display processing later described with reference to FIG. 11 or image display processing before display switch signal detection (step S5). In the processing, display of a menu screen displayed in the information image display area 31 of the second display 30 is changed based on operation of the driver, etc. In the menu screen display processing, processing of displaying any of various images of a back image of the vehicle, a navigation information image, etc., selected by the driver, etc., is performed.

After step S4 or step S5, the CPU 51 determines whether or not a predetermined signal is detected (step S6). That is, to receive a different signal from the signal received at step S1 and display different images on the first display 10 and the second display 30, the CPU 51 determines whether or not to terminate display of the images displayed on the first display 10 and the second display 30.

When it is determined that the predetermined signal is not detected (NO at step S6), the CPU 51 waits until detection of the predetermined signal (for example, another warning or alarm signal, a warning or alarm releasing signal, etc.,). That is, the images displayed on the first display 10 and the second display 30 are continuously displayed until a signal different from the signal received at step S1 is received.

When it is determined that the predetermined signal is detected (YES at step S6), the CPU 51 performs display termination processing (step S7) and returns to step S1. That is, when a different signal from the signal received at step S1 is received, the images displayed on the first display 10 and the second display 30 at step S2 to step S4 are not displayed, whereby the image display is terminated.

When it is determined that the predetermined signal is not detected at step S6, the CPU 51 may determine whether or not the display time corresponding to the type of report information (warning symbol 40, alarm symbol 41, master caution symbol 42, indicator symbol (not shown), information symbol 43) displayed on the first display 10 has elapsed and when the display time corresponding to the type of report information has elapsed, the CPU 51 may terminate the information image (warning image, alarm image, interaction image, report image) displayed on the second display 30.

Next, the symbol display processing of the CPU 51 according to the first embodiment of the invention will be discussed with reference to FIG. 5. FIG. 5 is a flowchart of the symbol display processing according to the first embodiment of the invention.

Figure 5:
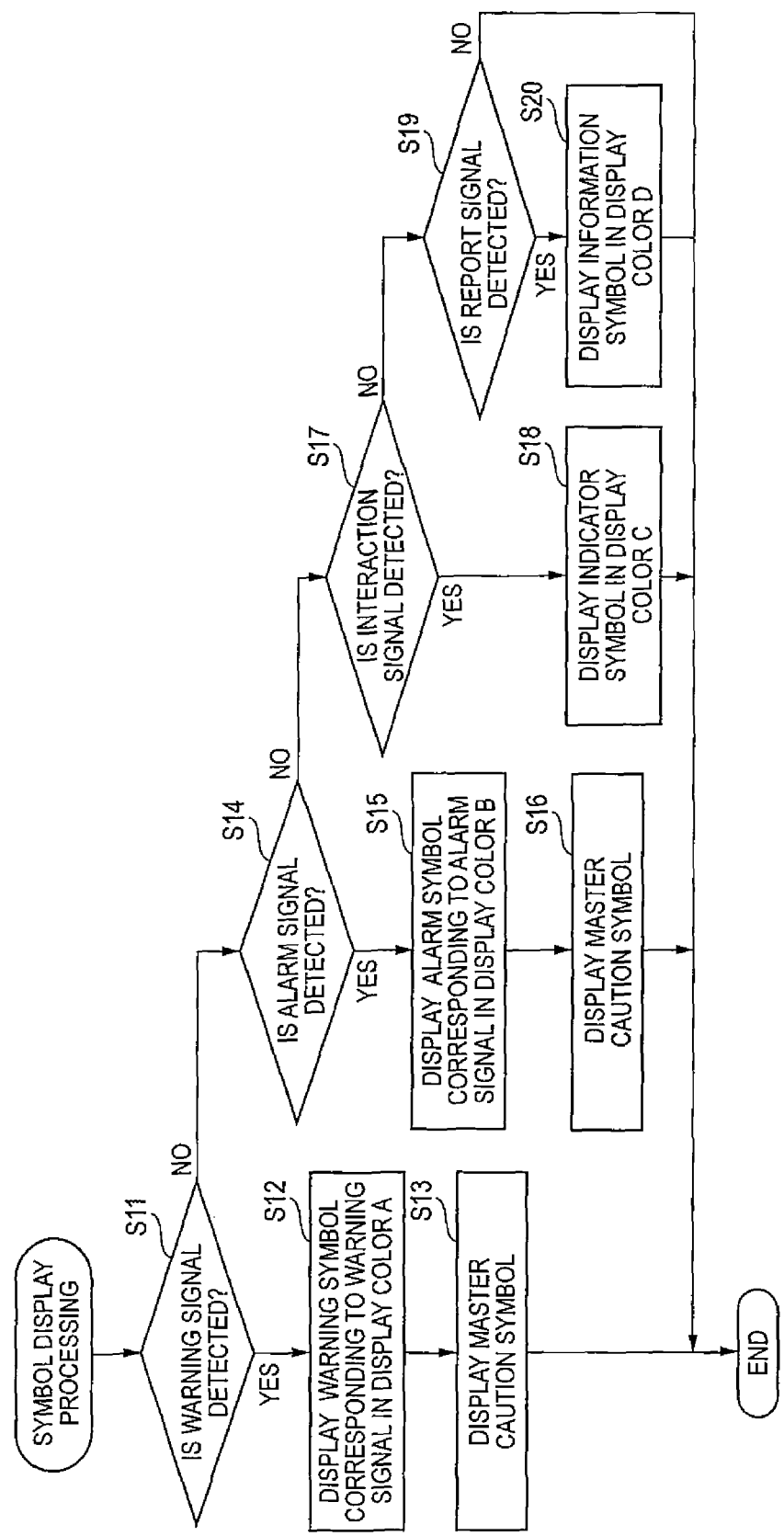
FIG. 5 is a flowchart of the symbol display processing according to the first embodiment of the invention.

As shown in FIG. 5, the CPU 51 determines whether or not a warning signal indicating an anomaly of the vehicle based on a signal received in the CAN communication section 55 (step S11). When it is determined that the detected signal is a warning signal indicating an anomaly (YES at step S11), the CPU 51 displays the warning symbol 40 (see FIG. 1) corresponding to the warning signal in a display color A (step S12). That is, if the detected signal is a warning signal indicating an anomaly of the vehicle, the CPU 51 displays the warning symbol 40 corresponding to the warning signal in the warning and alarm display part 15 (see FIG. 1) in the display color A (for example, red).

Next, the CPU 51 displays the master caution symbol 42 (see FIG. 1) in the master caution display part 16 (step S13). When this processing terminates, the symbol display processing is terminated.

On the other hand, when it is determined that the detected signal is not a warning signal (NO at step S11), the CPU 51 determines whether or not an alarm signal indicating an anomaly of the vehicle is detected based on a signal received in the CAN communication section 55 (step S14). When it is determined that the detected signal is an alarm signal indicating an anomaly of the vehicle (YES at step S14), the CPU 51 displays the alarm symbol 41 (see FIG. 10B) corresponding to the alarm signal in a display color B (step S15). That is, if the detected signal is an alarm signal indicating an anomaly of the vehicle, the CPU 51 displays the alarm symbol 41 corresponding to the received alarm signal in the warning and alarm display part 15 (see FIG. 1) in the display color B (for example, orange).

Next, the CPU 51 displays the master caution symbol 42 (see FIG. 1) in the master caution display part 16 (step S16). When this processing terminates, the CPU 51 terminates the symbol display processing.

On the other hand, when it is determined that the detected signal is not an alarm signal (NO at step S14), the CPU 51 determines whether or not an interaction signal indicating maintenance of the vehicle, etc., is detected based on the signal received in the CAN communication section 55 (step S17). When it is determined that the detected signal is an interaction signal indicating maintenance of the vehicle, etc., (YES at step S17), the CPU 51 displays the indicator symbol (not shown) corresponding to the interaction signal in a display color C (step. S18). That is, if the detected signal is an interaction signal for reporting maintenance information, etc., to the driver, the CPU 51 displays the indicator symbol corresponding to the detected interaction signal in the indicator information display part 17 (see FIG. 1) in the display color C (for example, green). When this processing terminates, the CPU 51 terminates the symbol display processing.

On the other hand, when it is determined that the detected signal is not an interaction signal (NO at step S17), the CPU 51 determines whether or not a report signal indicating information of the vehicle, etc., is detected based on the signal received in the CAN communication section 55 (step S19). When it is determined that the detected signal is not a report signal (NO at step S19), the CPU 51 terminates the symbol display processing.

On the other hand, when it is determined that the detected signal is a report signal indicating information of the vehicle, etc., (YES at step S19), the CPU 51 displays the information symbol 43 (see FIG. 1) in a display color D (step S20). That is, if the detected signal is a report signal for reporting information of the vehicle, etc., to the driver, the CPU 51 displays the information symbol 43 (see FIG. 1) corresponding to the detected report signal in the indicator information display part 17 (see FIG. 1) in the display color D (for example, blue). When this processing terminates, the CPU 51 terminates the symbol display processing.

Thus, the warning signal, the alarm signal, the interaction signal, and the report signal are associated with different display colors and the symbols 40, 41, and 43 are displayed in the display colors corresponding to the detected signals.

Figure 7A:
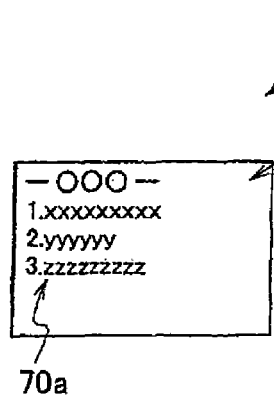
FIGS. 7A to 7C are drawings to show a screen where an information image displayed on a second display is scaled up for display according to the first embodiment of the invention.
Figure 7B:
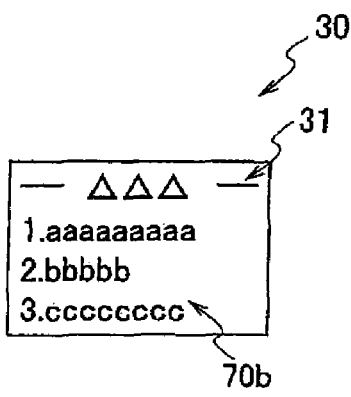
Figure 7C:
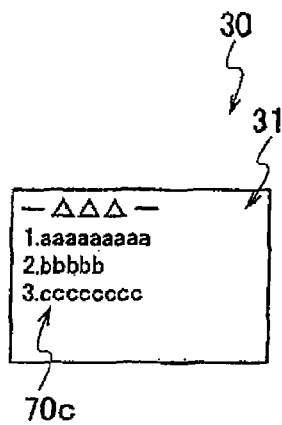
Figure 8A:
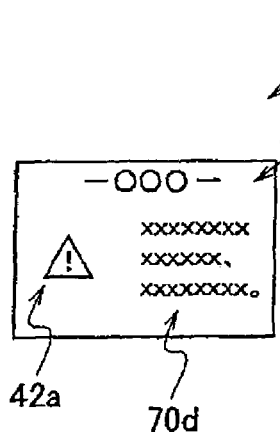
FIGS. 8A to 8C are drawings to show a screen where a warning image displayed on a second display is scaled up for display according to the first embodiment of the invention.
Figure 8B:
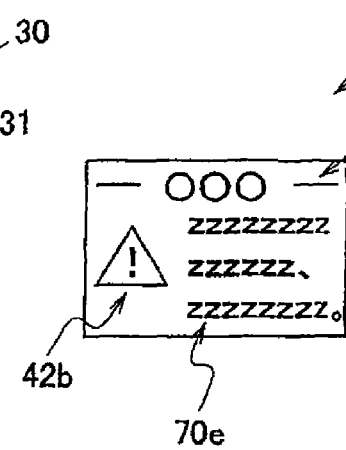
Figure 8C:
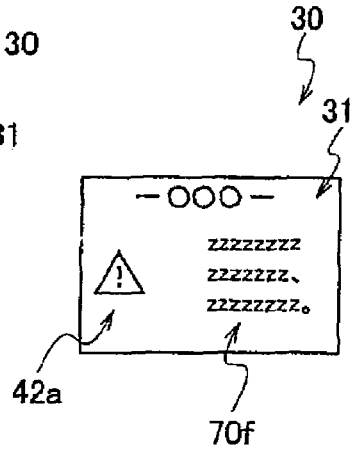

Next, the information image scale-up processing of the CPU 51 according to the first embodiment of the invention will be discussed with reference to FIGS. 6 to 8. FIG. 6 is a flowchart of the information image scale-up processing according to the first embodiment of the invention. FIG. 7A is a drawing to show a screen before an information image displayed on the second display 30 is switched according to the first embodiment of the invention. FIG. 7B is a drawing to show a screen where an information image displayed on the second display 30 is switched and is scaled up for display according to the first embodiment of the invention. FIG. 7C is a drawing to show a screen after the information image displayed on the second display 30 is switched according to the first embodiment of the invention. FIG. 8A is a drawing to show a screen before a warning image displayed on the second display 30 is switched according to the first embodiment of the invention. FIG. 8B is a drawing to show a screen where a warning image displayed on the second display 30 is switched to another warning image and the image is scaled up for display according to the first embodiment of the invention. FIG. 8C is a drawing to show a screen after the warning image is switched according to the first embodiment of the invention.

Figure 6:
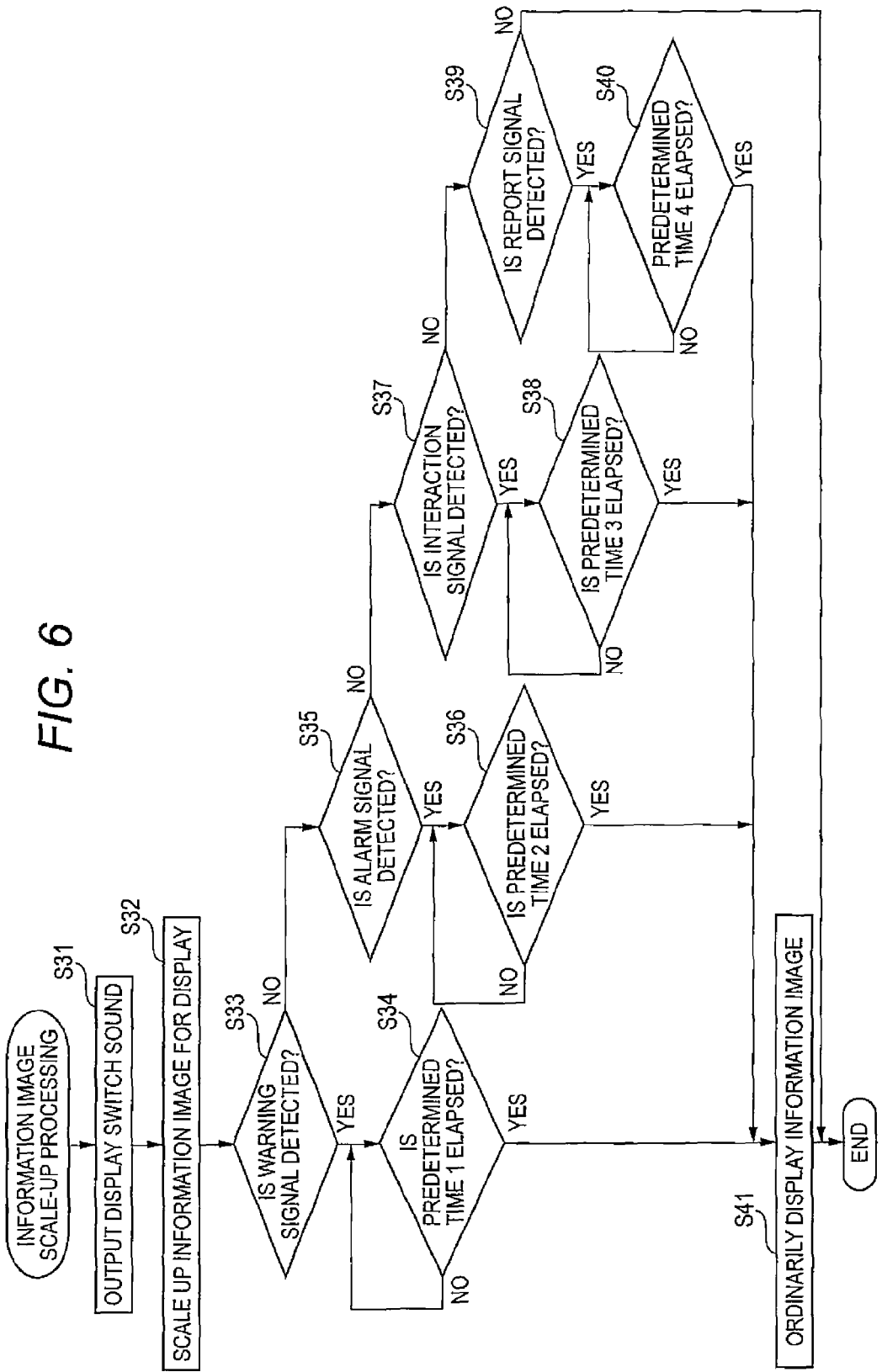
FIG. 6 is a flowchart of information image scale-up processing according to the first embodiment of the invention.

As shown in FIG. 6, the CPU 51 outputs a display switch sound through a loudspeaker (not shown) (step S31). This means that the CPU 51 controls to output a report sound for reporting to the driver that display of the second display 30 is switched to other.

Next, the CPU 51 scales up an information image for display (step S32). That is, a text image 70a displayed in the information image display area 31 of the second display 30 as shown in FIG. 7A is switched and text image data corresponding to the display switch signal (see step S1 in FIG. 4) is scaled up and is generated and a text image 70b is displayed larger than the text image 70a as shown in FIG. 7B. To scale up the information image for display, the scaling-up factor may be increased gradually.

If the display switch signal for switching display of the second display 30 is a warning signal or an alarm signal indicating an anomaly of the vehicle, a text image 70d and a master caution symbol 42a are displayed in the information image display area 31 of the second display 30 as shown in FIG. 8A. If the received signal is a different warning signal or alarm signal, the CPU 51 scales up and generates text image data and master caution symbol image data and displays a text image 70e larger than the text mage 70d and a master caution symbol 42b larger than the master caution symbol 42a as shown in FIG. 8B.

Next, the CPU 51 determines whether or not a warning signal indicating an anomaly of the vehicle is detected based on the signal received in the CAN communication section 55 (step S33). When it is determined that the detected signal is a warning signal indicating an anomaly of the vehicle (YES at step S33), the CPU 51 determines whether or not predetermined time 1 (for example, 40 seconds) has elapsed (step S34). That is, the CPU 51 counts the time from scaling up the information image with a timer (not shown) and determines whether or not the predetermined time has elapsed.

When it is determined that the predetermined time 1 does not elapse (NO at step S33), the CPU 51 waits until the predetermined time 1 elapses. On the other hand, when it is determined that the predetermined time 1 has elapsed (YES at step S33), the CPU 51 goes to step S41.

On the other hand, when it is determined that the detected signal is not a warning signal (NO at step S33), the CPU 51 determines whether or not an alarm signal indicating an anomaly of the vehicle is detected based on the signal received in the CAN communication section 55 (step S35). When it is determined that the detected signal is an alarm signal indicating an anomaly of the vehicle (YES at step S35), the CPU 51 determines whether or not predetermined time 2 (for example, 30 seconds) has elapsed (step S36).

When it is determined that the predetermined time 2 does not elapse (NO at step S36), the CPU 51 waits until the predetermined time 2 elapses. On the other hand, when it is determined that the predetermined time 2 has elapsed (YES at step S36), the CPU 51 goes to step S41.

On the other hand, when it is determined that the detected signal is not an alarm signal (NO at step S35), the CPU 51 determines whether or not an interaction signal indicating maintenance of the vehicle, etc., is detected based on the signal received in the CAN communication section 55 (step S37). When it is determined that the detected signal is an interaction signal indicating maintenance of the vehicle, etc., (YES at step S37), the CPU 51 determines whether or not predetermined time 3 (for example, 20 seconds) has elapsed (step S38).

When it is determined that the predetermined time 3 does not elapse (NO at step S38), the CPU 51 waits until the predetermined time 3 elapses. On the other hand, when it is determined that the predetermined time 3 has elapsed (YES at step S38), the CPU 51 goes to step S41.

On the other hand, when it is determined that the detected signal is not an interaction signal (NO at step S37), the CPU 51 determines whether or not a report signal indicating information of the vehicle, etc., is detected based on the signal received in the CAN communication section 55 (step S39). When it is determined that the detected signal is not a report signal (NO at step S39), the CPU 51 terminates the information image scale-up processing.

On the other hand, when it is determined that the detected signal is a report signal indicating information of the vehicle, etc., (YES at step S39), the CPU 51 determines whether or not predetermined time 4 (for example, 10 seconds) has elapsed (step S40). When it is determined that the predetermined time 4 does not elapse (NO at step S40), the CPU 51 waits until the predetermined time 4 elapses. On the other hand, when it is determined that the predetermined time 4 has elapsed (YES at step S40), the CPU 51 goes to step S41.

When it is determined that the predetermined time 1 has elapsed (YES at step S34), when it is determined that the predetermined time 2 has elapsed (YES at step S36), when it is determined that the predetermined time 3 has elapsed (YES at step S38), or when it is determined that the predetermined time 4 has elapsed (YES at step S40), the CPU 51 ordinarily displays the information image (step S41). That is, as shown in FIGS. 7C and 8C, the CPU 51 reads the text image data and the master caution symbol image data scaled up and displayed in the information image display area 31 of the second display 30 and displays text images 70c and 70f and the master caution symbol 42a in the ordinary size (the size before scale up). To ordinarily display the information image, the scaling-down factor may be decreased gradually. When the processing terminates, the CPU 51 terminates the information image scale-up processing.

Thus, the warning signal, the alarm signal, the interaction signal, and the report signal are associated with different scale-up times and when the report information (symbol 40, 41, 43) is displayed on the first display 10, the information image (warning image, alarm image, interaction image, or report image) is scaled up for display on the second display 30 until the time corresponding to the warning signal, the alarm signal, the interaction signal, or the report signal elapses. Thus, the information image easily comes within sight of the driver and the driver can recognize that report information is displayed on the first display 10 without moving a line of sight.

As ordinary display time of the information image, different display times are associated with the warning signal, the alarm signal, the interaction signal, and the report signal and after the display time corresponding to the detected signal has elapsed, display of the information image (warning image, alarm image, interaction image, or report image) may be terminated and an image selected by the driver, etc., (for example, a back image of the vehicle picked up with a camera, a navigation image indicating the place where the vehicle exists at present and a road to the destination, etc.,) may be displayed.

In this case, the warning image and the alarm image are displayed for relatively longer time than the interaction image and the report image, whereby the driver easily understands the descriptions of the warning and the alarm of high importance displayed in the information image display area 31.

In FIGS. 7A to 7C, the case where only the text image 70 is scaled up for the predetermined time is described, but the indicator symbol (not shown) and the information symbol 43 (see FIG. 2) and the text image 70 may be scaled up for display for a predetermined time.

in FIGS. 8A to 8C, the case where the master caution symbol 42 is scaled up for display for the predetermined time is described, but the warning symbol 40 or the alarm symbol 41 and the text image 70 may be scaled up for display for a predetermined time. Further, after the master caution symbol 42 is scaled up for display for the predetermined time is described, the warning symbol 40 or the alarm symbol 41 may be displayed in the ordinary size.

Thus, when the information image displayed on the second display 30 is switched to the other, the information image is scaled up for the predetermined time, whereby a change in the information image comes within sight of the driver, so that the driver can recognize that the information image displayed on the second display 30 switches.

The warning image and the alarm image are scaled up for display for a relatively longer time than the interaction image and the report image, whereby a driver's line of sight is induced to the information image display area 31 and the driver can reliably understand the descriptions of the warning and the alarm of high importance displayed in the information image display area 31.

Further, the warning image and the alarm image are displayed in relatively larger scale-up ratio than the interaction image and the report image, whereby when the warning image and the alarm image are displayed, a driver's line of sight may be easily induced to the information image display area 31.

Next, the background color display processing of the CPU 51 according to the first embodiment of the invention will be discussed with reference to FIGS. 9 and 10. FIG. 9 is a flowchart of the background color display processing according to the first embodiment of the invention. FIG. 10A is a drawing to show a warning screen displayed on the second display 30 according to the first embodiment of the invention. FIG. 10B is a drawing to show an alarm screen displayed on the second display 30 according to the first embodiment of the invention. FIG. 10C is a drawing to show an interaction screen displayed on the second display 30 according to the first embodiment of the invention. FIG. 10D is a drawing to show an information screen displayed on the second display 30 according to the first embodiment of the invention.

Figure 9:
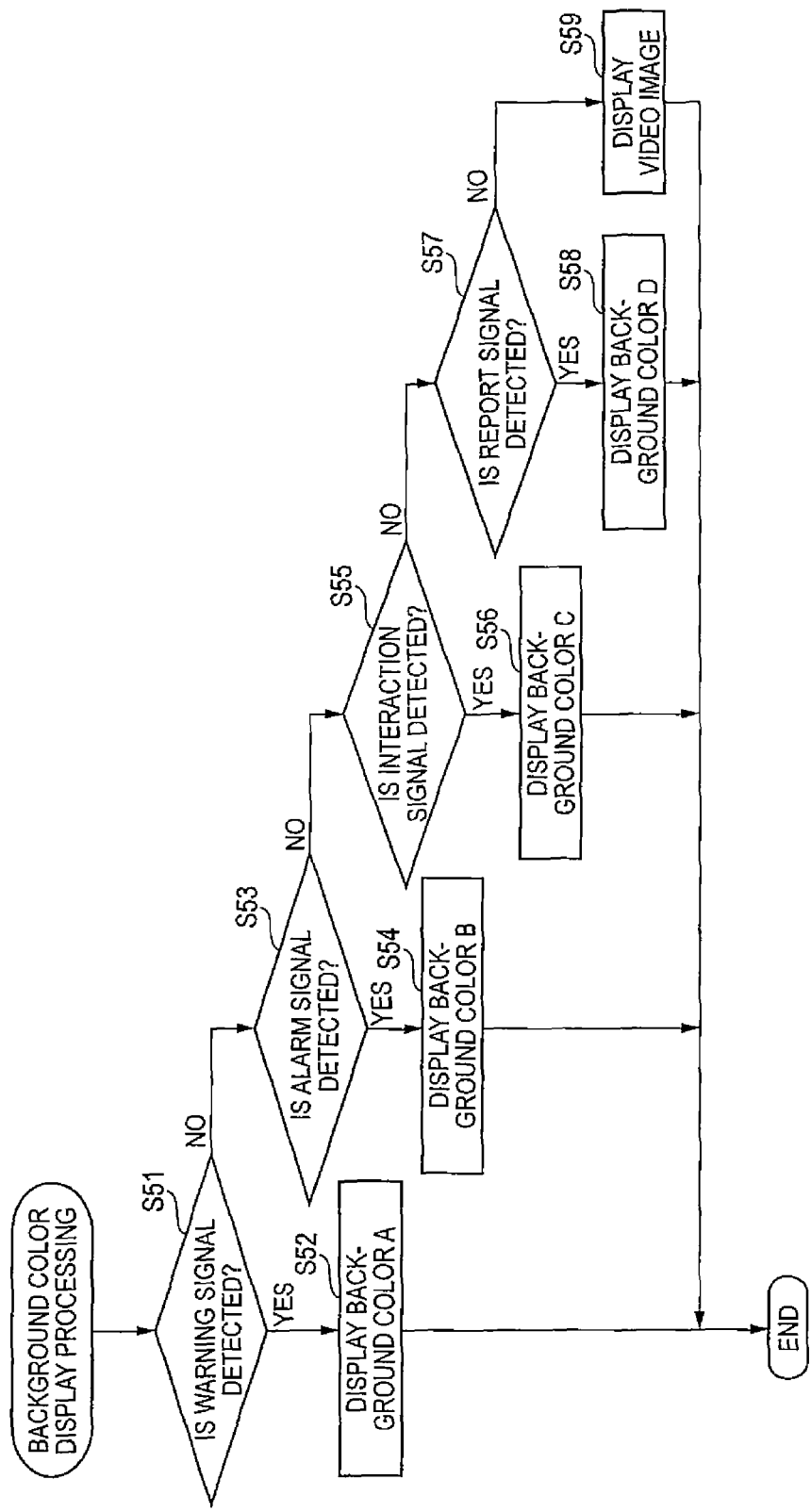
FIG. 9 is a flowchart of background color display processing according to the first embodiment of the invention.
Figure 10:
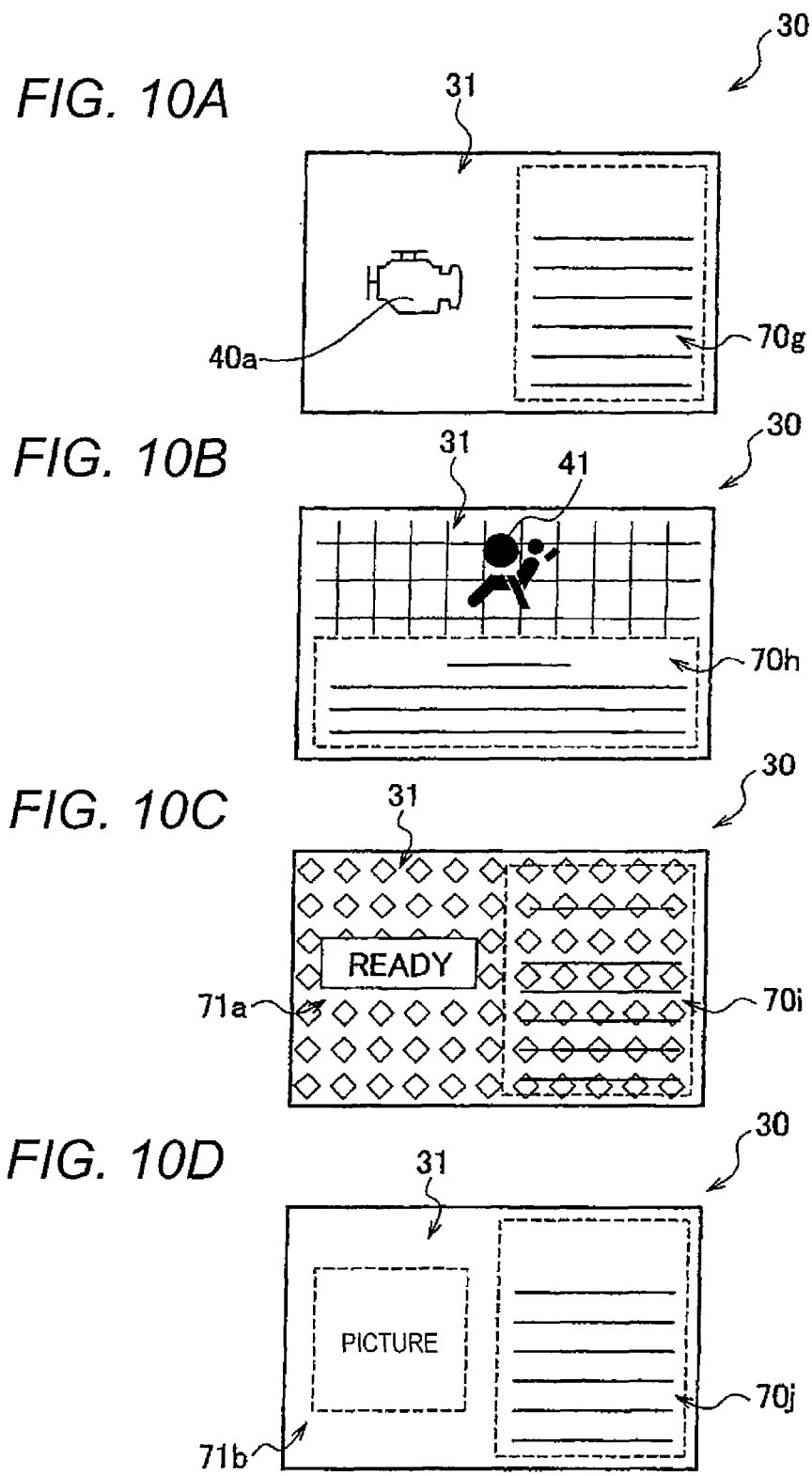
FIGS. 10A to 10D are drawings to show information images displayed on the second display according to the first embodiment of the invention.

As shown in FIG. 9, the CPU 51 determines whether or not a warning signal indicating an anomaly of the vehicle is detected based on the signal received in the CAN communication section 55 (step S51). When it is determined that the detected signal is a warning signal indicating an anomaly of the vehicle (YES at step S51), the CPU 51 displays the background of the information image display area 31 of the second display 30 in a background color A (step S52). That is, if the detected signal is a warning signal indicating an anomaly of the vehicle, the CPU 51 displays the background of the warning image in the background color A corresponding to the detected warning signal (for example, red) as shown in FIG. 10A. When the processing terminates, the CPU 51 terminates the background color display processing.

On the other hand, when it is determined that the detected signal is not a warning signal (NO at step S51), the CPU 51 determines whether or not an alarm signal indicating an anomaly of the vehicle is detected based on the signal received in the CAN communication section 55 (step S53).

When it is determined that the detected signal is an alarm signal indicating an anomaly of the vehicle (YES at step S53), the CPU 51 displays the background of the information image display area 31 of the second display 30 in a background color B (step S54). That is, if the detected signal is an alarm signal indicating an anomaly of the vehicle, the CPU 51 displays the background of the alarm image in the background color B corresponding to the detected alarm signal (for example, orange) as shown in FIG. 10B. When the processing terminates, the CPU 51 terminates the background color display processing.

On the other hand, when it is determined that the detected signal is not an alarm signal (NO at step S53), the CPU 51 determines whether or not an interaction signal indicating maintenance of the vehicle, etc., is detected based on the signal received in the CAN communication section 55 (step S55). When it is determined that the detected signal is an interaction signal indicating maintenance of the vehicle, etc., (YES at step S55), the CPU 51 displays the background of the information image display area 31 of the second display 30 in a background color C (step S56). That is, if the detected signal is an interaction signal indicating maintenance of the vehicle, etc., the CPU 51 displays the background of the interaction image in the background color C corresponding to the detected interaction signal (for example, green) as shown in FIG. 10C. When the processing terminates, the CPU 51 terminates the background color display processing.

On the other hand, when it is determined that the detected signal is not an interaction signal (NO at step S55), the CPU 51 determines whether or not a report signal indicating information of the vehicle, etc., is detected based on the signal received in the CAN communication section 55 (step S57). When it is determined that the detected signal is a report signal indicating information of the vehicle, etc., (YES at step S57), the CPU 51 displays the background of the information image display area 31 of the second display 30 in a background color D (step S58). That is, if the detected signal is a report signal indicating information of the vehicle, etc., the CPU 51 displays the background of the report image in the background color D corresponding to the detected interaction signal (for example, blue) as shown in FIG. 10D. When the processing terminates, the CPU 51 terminates the background color display processing.

On the other hand, when it is determined that the detected signal is not a report signal (NO at step S57), the CPU 51 displays external video, etc., in the information image display area 31 of the second display 30 (step S59). That is, when the warning image, the alarm image, the interaction image, and the report image are not displayed, an image selected by the driver, etc., such as a back image of the vehicle or a navigation information image is displayed. When the processing terminates, the CPU 51 terminates the background color display processing.

To display the warning image, the warning symbol 40a corresponding to the warning symbol 40 displayed in the warning and alarm display part 15 of the first display (see FIG. 1) and the text image 70g indicating the warning description are displayed as shown in FIGS. 10A to 10D. To display the alarm image, the alarm symbol 41a corresponding to the alarm symbol 41 displayed in the warning and alarm display part 15 of the first display 10 and a text image 70h indicating the alarm description are displayed.

Further, to display the interaction image indicating maintenance of the vehicle, etc., an image 71a corresponding to the indicator symbol (not shown) displayed in the indicator information display part 17 of the first display 10 (see FIG. 1) and a text image 70i indicating the description of maintenance, etc., are displayed. To display the report image indicating information of the vehicle, etc., an image 71b corresponding to the information symbol 43 displayed in the indicator information display part 17 and a text image 70j indicating the description of the information are displayed.

Thus, the warning signal, the alarm signal, the interaction signal, and the report signal are associated with different display colors and when the report information (symbol 40, 41, 43) is displayed on the first display 10, the background of the information image is displayed on the second display 30 in the display color corresponding to the warning signal, the alarm signal, the interaction signal, or the report signal. Thus, the display color comes within sight of the driver, whereby the driver can recognize the type of report information displayed on the first display.

When the warning symbol 40, the alarm symbol 41, or the information symbol 43 is displayed on the first display, the background of the information image on the second display is displayed in the background color corresponding to the symbol 40, 41, or 43, so that the information image and the symbol 40, 41, 43 can be unified.

Further, unless the second display 30 is visually recognized, the type of information image can be understood according to the background color coming within sight of the driver, so that a driver's line of sight need not be moved during driving and safety can be enhanced.

Next, the menu screen display processing of the CPU 51 according to the first embodiment of the invention will be discussed with reference to FIGS. 11 and 12. FIG. 11 is a flowchart of the menu screen display processing according to the first embodiment of the invention. FIG. 12A is a drawing to show a screen where the whole background of a menu screen is switched according to the first embodiment of the invention. FIG. 12B is a drawing to show a screen where a part of the background of the menu screen is switched according to the first embodiment of the invention. FIG. 12C is a drawing to show a screen just after the background of the menu screen is switched according to the first embodiment of the invention. FIG. 12D is a drawing to show a screen after the background of the menu screen is switched according to the first embodiment of the invention.

Figure 11:
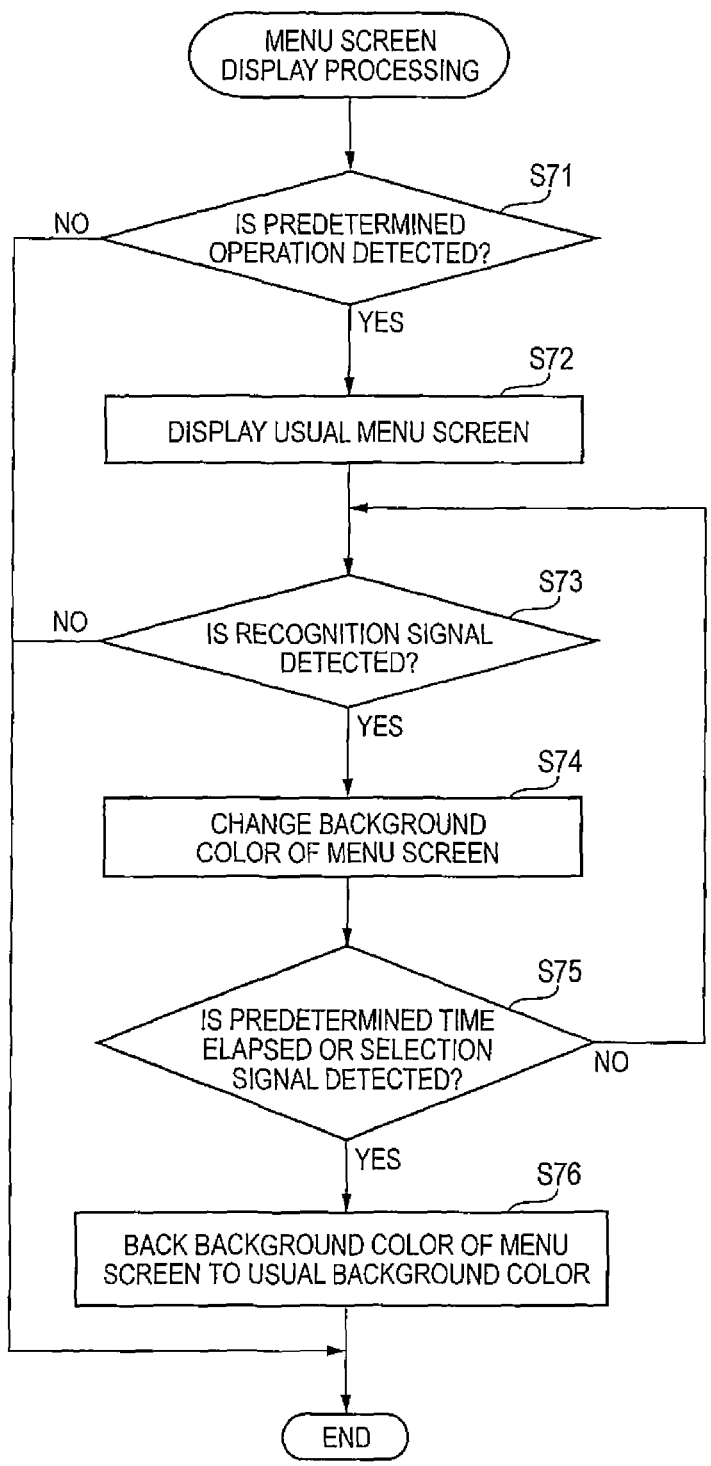
FIG. 11 is a flowchart of menu screen display processing according to the first embodiment of the invention.
Figure 12:
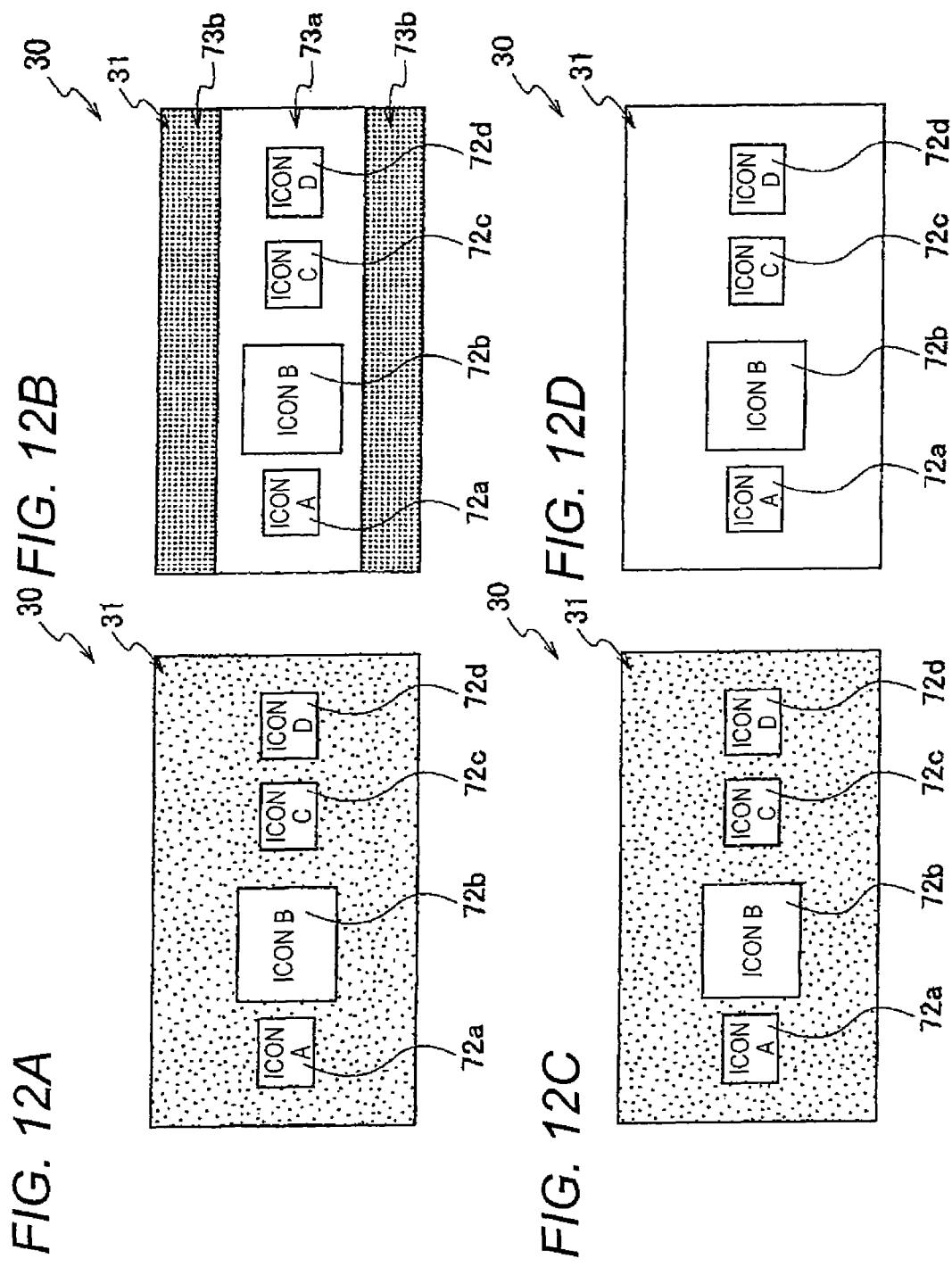
FIGS. 12A to 12D are drawings to show a menu screen displayed on the second display according to the first embodiment of the invention.

As shown in FIG. 11, the CPU 51 determines whether or not predetermined operation is detected (step S71). Specifically, the CPU 51 determines whether or not operation of the menu switch 83 (see FIG. 2) of the steering switches 80 (see FIG. 2) is detected.

Next, the CPU 51 displays a usual menu screen (step S72). The menu screen is a screen for the driver, etc., to choose which of various screens of a back image of the vehicle, a navigation information screen, etc., is to be displayed on the second display 30 when the warning image, the alarm image, the interaction image, and the report image are not displayed. The menu screen displays icon images 72a to 72d for the driver, etc., to select one menu from a plurality of menus (for example, operation item to display which of various images) (see FIGS. 12A to 12D).

Next, the CPU 51 determines whether or not a recognition signal is detected (step S73). That is, the CPU 51 determines whether or not one of the icon images 72a to 72d is recognized as the driver, etc., operates the direction switch 81 of the steering switches 80.

When it is determined that the recognition signal is not received within a predetermined time (NO at step S73), the CPU 51 terminates the menu screen display processing. On the other hand, when it is determined that the recognition signal is detected (YES at step S73), the CPU 51 changes the background color of the menu screen (the background color of the icon images 72a to 72d) (step S74).

That is, the icon images 72a to 72d are associated with different display colors (for example, yellow, green, light blue, pink, etc.,); as shown in FIG. 12A, when the icon image 72b is recognized, the background of the menu screen (the background of the icon images 72a to 72d) is displayed in the display color corresponding to the icon image 72b (for example, green) from usual background color (for example, black). The recognized icon image 72b is displayed larger than other icon images 72a, 72c, 72d.

To change the background color of the menu screen (the background color of the icon images 72a to 72d), a part of the background may be changed as shown in FIG. 12B. To change a part of the background (50% or more of the whole), for example, an area 73a of the center part where the icon images 72a to 72d are displayed is displayed in white and areas 73b of margin parts where the icon images 72a to 72d are not displayed is displayed in the background color corresponding to the icon image 72b (for example, green).

Next, the CPU 51 determines whether or not a predetermined time has elapsed or a selection signal is selected (step S75). That is, the CPU 51 counts the time from change of the background of the menu screen with a timer (not shown) and determines whether or not the predetermined time has elapsed. The CPU 51 also determines whether or not one of the icon images 72a to 72d recognized at step S73 is selected as the driver, etc., operates the determination switch 82 (see FIG. 2) of the steering switches 80.

When it is determined that the predetermined time has not elapsed or the selection signal is not detected (NO at step S75), the CPU 51 goes to step S73. That is, if the predetermined time has not elapsed or the selection signal is not detected, other icon images 72a to 72d than the icon images 72a to 72d detected at step S73 can be recognized. On the other hand, when it is determined that the predetermined time has elapsed or the selection signal is detected (YES at step S75), the CPU 51 controls to back the background color of the menu screen to the usual background color (for example, black) (step S76) as shown in FIGS. 12C and 12 (d). When the processing terminates, any of various images of a back image of the vehicle, a navigation information image, etc., selected by the driver, etc., is displayed on the second display 30 and the menu screen display processing is terminated.

In FIGS. 11 and 12, when the warning image, the alarm image, the interaction image, and the report image are not displayed, which of various images of a back image of the vehicle, a navigation information image, etc., is to be displayed is chosen out of the menu screen. However, when the warning image or an alarm image of relatively high importance is not displayed, which of various images of a back image of the vehicle, a navigation information image, etc., may be chosen out of the menu screen.

In FIGS. 11 and 12, when any of the icon images 72a to 72d is recognized, the background of the menu screen is displayed in the display color corresponding to the recognized icon image. However, when any of the icon images 72a to 72d is recognized, the background is displayed and a recognition sound corresponding to the recognized icon image may be output to a loudspeaker (not shown).

Thus, when the report information (symbol 40, 41, 43) is not displayed on the first display 10, the background is displayed on the second display 30 in the display color of any of the icon images 72a to 72d recognized by operating the direction switch 81. Thus, the display color comes within sight of the driver, whereby the driver can recognize the type of icon image 72a to 72d without directly viewing the second display 30. The driver need not directly view the menu screen more than once until selection of the target menu, and safety during driving can be enhanced.

Figure 13:
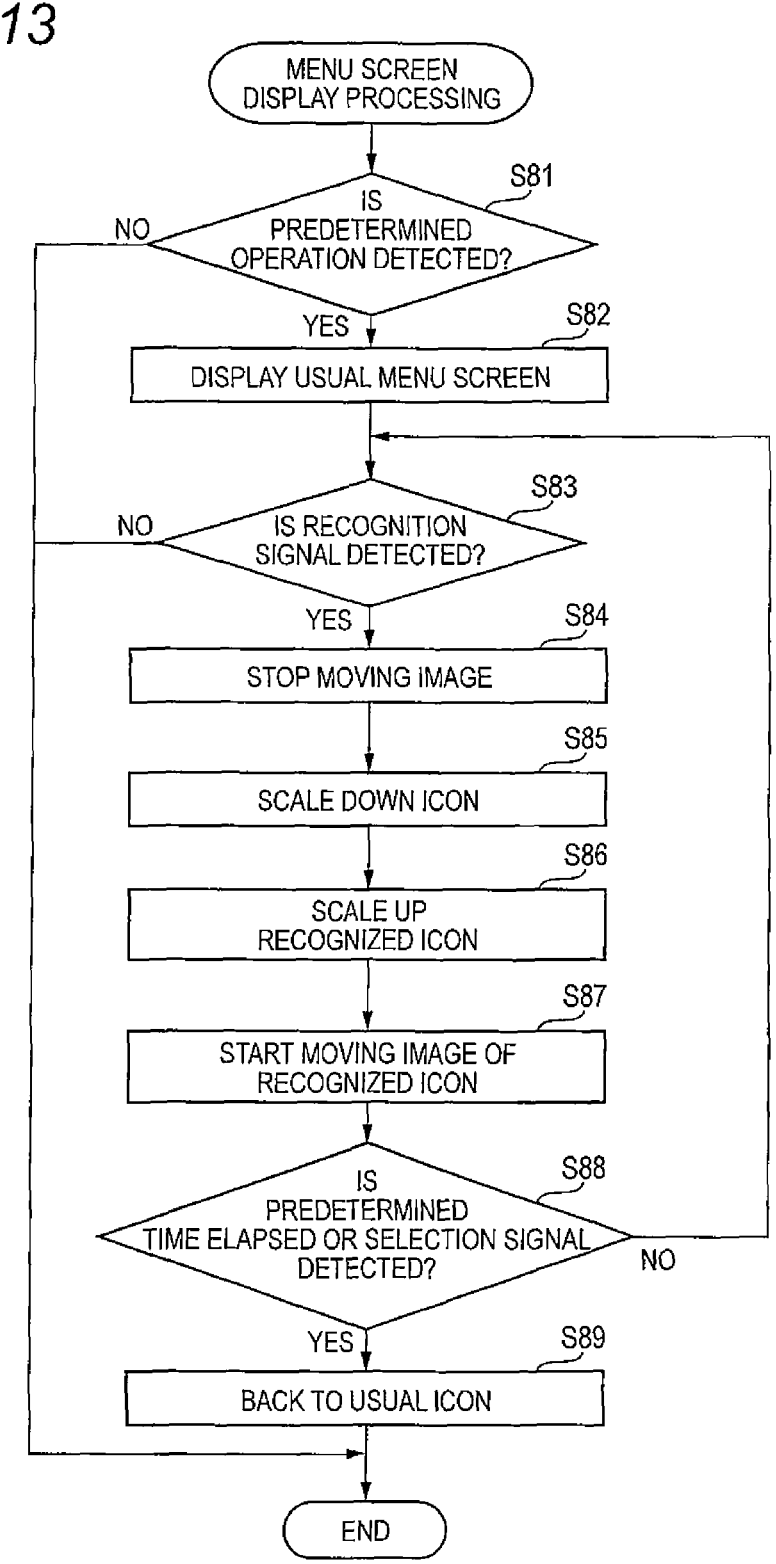
FIG. 13 is a flowchart of menu screen display processing according to a second embodiment of the invention.
Figure 14A:
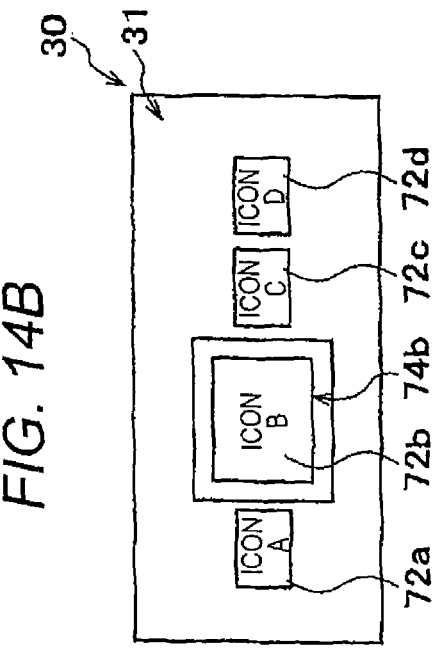
FIGS. 14A and 14B are drawings to show a menu screen displayed on a second display according to the second embodiment of the invention.
Figure 14B:
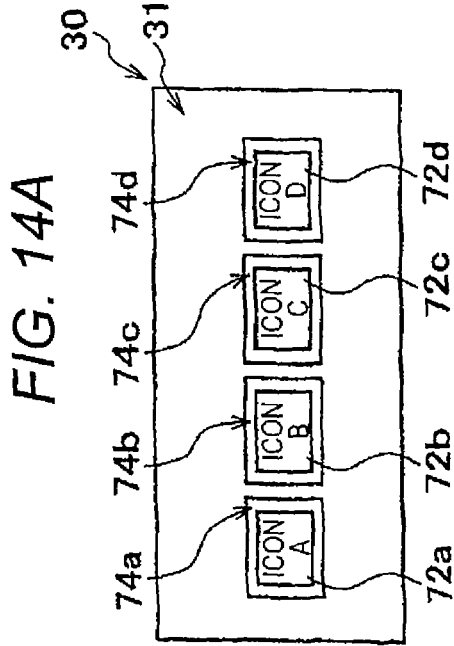
Figure 15A:
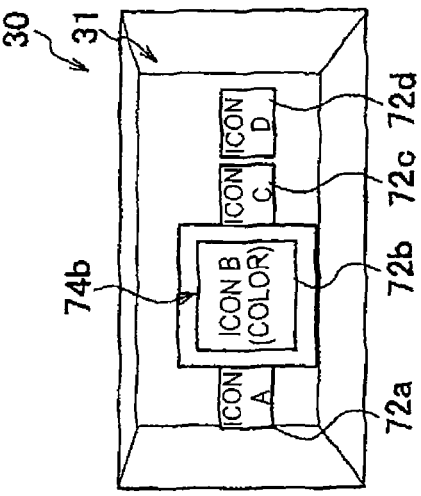
FIGS. 15A to 15C are drawings to show a menu screen displayed on the second display according to the second embodiment of the invention.
Figure 15B:
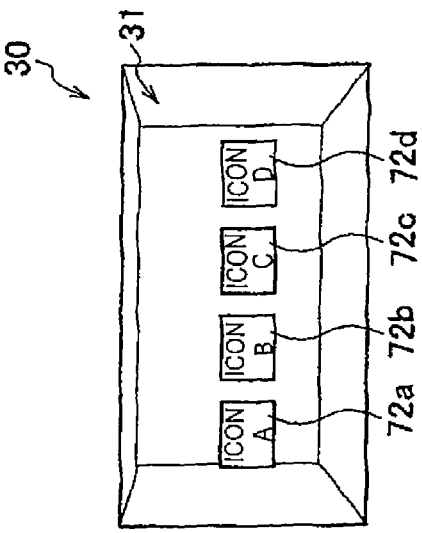
Figure 15C:
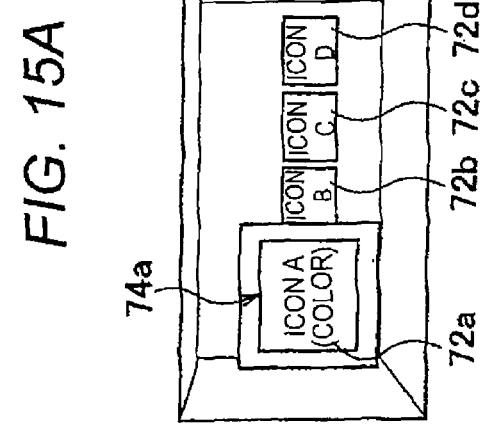

Next, menu screen display processing of a CPU 51 according to a second embodiment of the invention will be discussed with reference to FIGS. 13 to 15. FIG. 13 is a flowchart of the menu screen display processing according to the second embodiment of the invention. FIG. 14A is a drawing to show a menu screen according to the second embodiment of the invention. FIG. 14B is a drawing to show the menu screen when an icon image is recognized according to the second embodiment of the invention. FIG. 15A is a drawing to show the menu screen when an icon image is recognized according to the second embodiment of the invention. FIG. 15B is a drawing to show the menu screen after an icon image is recognized according to the second embodiment of the invention. FIG. 15C is a drawing to show a moving image display screen of the menu screen according to the second embodiment of the invention.

An on-vehicle display device 1 according to the second embodiment has a roughly similar configuration to that of the on-vehicle display device 1 according to the first embodiment of the invention and therefore the similar configuration will not be discussed again. Components similar to those of the on-vehicle display device 1 according to the first embodiment are denoted by the same reference numerals for description.

As shown in FIG. 13, the CPU 51 determines whether or not predetermined operation is detected (step S81). Specifically, the CPU 51 determines whether or not operation of the menu switch 83 (see FIG. 2) of the steering switches 80 (see FIG. 2).

Next, the CPU 51 displays a usual menu screen (step S82). The menu screen is a screen for the driver, etc., to choose which of various screens of a back image of the vehicle, a navigation information screen, etc., is to be displayed on a second display 30 when the warning image, the alarm image, the interaction image, and the report image are not displayed. The menu screen displays icon images 72*a* to 72*d* for the driver, etc., to select one menu from a plurality of menus (for example, operation item to display which of various images) (see FIGS. 14A and 15A).

As shown in FIGS. 14A and 15A, moving image display areas 74*a* to 74*d* for displaying moving image are provided on the peripheries of the icon images 72*a* to 72*d*. Different moving image is displayed in each of the moving image display areas 74*a* to 74*d*.

Next, the CPU 51 determines whether or not a recognition signal is detected (step S83). That is, the CPU 51 determines whether or not one of the icon images 72*a* to 72*d* is recognized as the driver, etc., operates a direction switch 81 of the steering switches 80.

When it is determined that the recognition signal is not received within a predetermined time (NO at step S83), the CPU 51 terminates the menu screen display processing. On the other hand, when it is determined that the recognition signal is detected (YES at step S83), the CPU 51 stops the moving image displayed in the moving image display area 74*a* to 74*d* (step S84). That is, the moving image display areas 74*a* to 74*d* are placed in non-display, thereby stopping the moving image (see FIG. 15B).

Next, the CPU 51 scales down the icon images 72*a* to 72*d* for display (step S85). The CPU 51 scales up the recognized icon image 72*a* to 72*d* for display (step S86) and displays the moving image of the recognized icon image 72*a* to 72*d* (step S87). For example, if the icon image 72*b* is recognized as the driver operates the direction switch 81, the moving image displayed in the moving image display area 74*a* to 74*d* is stopped and the icon image 72*b* is scaled down for display (see FIG. 15B). The recognized icon image 72*b* is scaled up and the moving image corresponding to the icon image 72*b* is displayed in the moving image display area 74*b* (see FIG. 14B).

That is, different moving images are associated with the icon images 72*a* to 72*d* and when one of the icon images 72*a* to 72*d* is recognized, the moving image corresponding to the recognized icon image 72*a* to 72*d* is displayed in the moving image display area 74*a* to 74*d*.

Next, the CPU 51 determines whether or not a predetermined time has elapsed or a selection signal is selected (step S88). That is, the CPU 51 counts the time from display of the image corresponding to the recognized icon image 72*a* to 72*d* in the moving image display area 74*a* to 74*d* with a timer (not shown) and determines whether or not the predetermined time has elapsed. The CPU 51 also determines whether or not one of the icon images 72*a* to 72*d* recognized at step S83 is selected as the driver, etc., operates a determination switch 82 of the steering switches 80.

When it is determined that the predetermined time has not elapsed or the selection signal is not detected (NO at step S88), the CPU 51 goes to step S83. On the other hand, when it is determined that the predetermined time has elapsed or the selection signal is detected (YES at step S88), the CPU 51 controls to back the selected icon image 72*a* to 72*d* to the usual icon image 72*a* to 72*d* (step S89). This means that the usual menu screen (see FIG. 14A) is displayed. When the processing terminates, any of various images of a back image of the vehicle, a navigation information image, etc., selected by the driver, etc., is displayed on the second display 30 and the menu screen display processing is terminated.

The second display 30 may display the background of the icon images 72*a* to 72*d* three-dimensionally as shown in FIGS. 15A to 15C. When the icon image 72*a* is recognized as shown in FIG. 15A, the moving image displayed in the moving image display area 74*a* to 74*d* of the icon image 72*a* to 72*d* is stopped (non-display). When the icon image 72*b* is recognized, the moving image is displayed in the moving image display area 74*b* and the icon image 72*b* is scaled up as shown in FIG. 15A. Since the background of the icon images 72*b* is displayed three-dimensionally, if the recognized icon image 72*b* is scaled up, the icon image 72*b* is displayed so as to move toward the driver, whereby enhanced display can be produced.

In FIGS. 13 to 15, when the warning image, the alarm image, the interaction image, and the report image are not displayed, which of various images of a back image of the vehicle, a navigation information image, etc., is to be displayed is chosen out of the menu screen. However, when the warning image or an alarm image of relatively high importance is not displayed, which of various images of a back image of the vehicle, a navigation information image, etc., may be chosen out of the menu screen.

In FIGS. 13 to 15, when any of the icon images 72*a* to 72*d* is recognized, the moving image corresponding to the recognized icon image is displayed in the moving image display area 74*a* to 74*d*. However, when any of the icon images 72*a* to 72*d* is recognized, the moving image is displayed and a recognition sound corresponding to the recognized icon image may be output to a loudspeaker (not shown).

Thus, when the report information is not displayed on the first display 10, the moving image is displayed on the second display 30 on the periphery of any of the icon images 72*a* to 72*d* recognized by operating the direction switch 81. Thus, the moving image comes within sight of the driver, whereby the driver can easily recognize the type of icon image 72*a* to

72d without directly viewing the second display 30. The driver need not directly view the menu screen more than once until selection of the target menu, and safety during driving can be enhanced.

Figure 16:
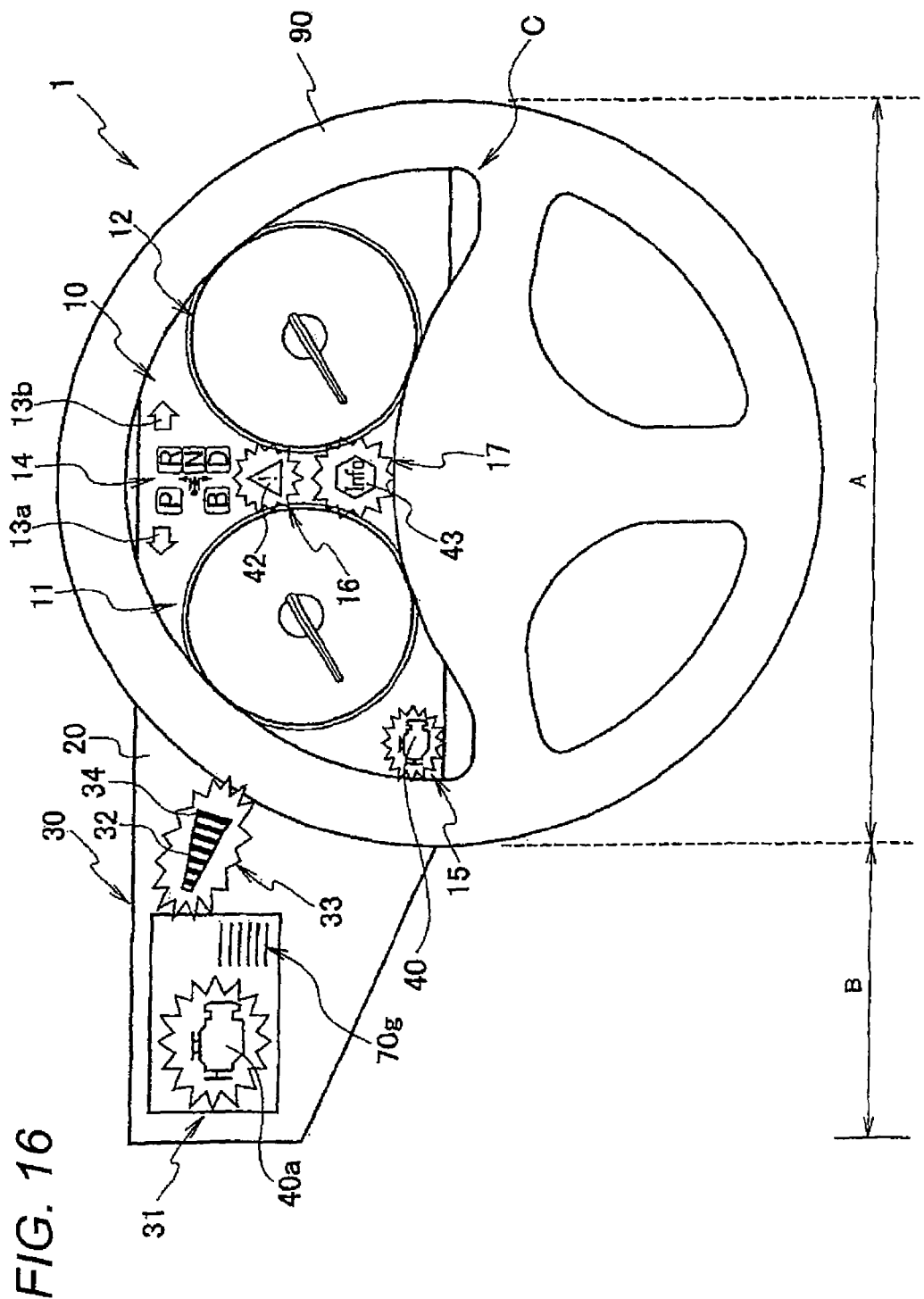
FIG. 16 is a drawing to show an on-vehicle display device according to a third embodiment of the invention.
Figure 17:
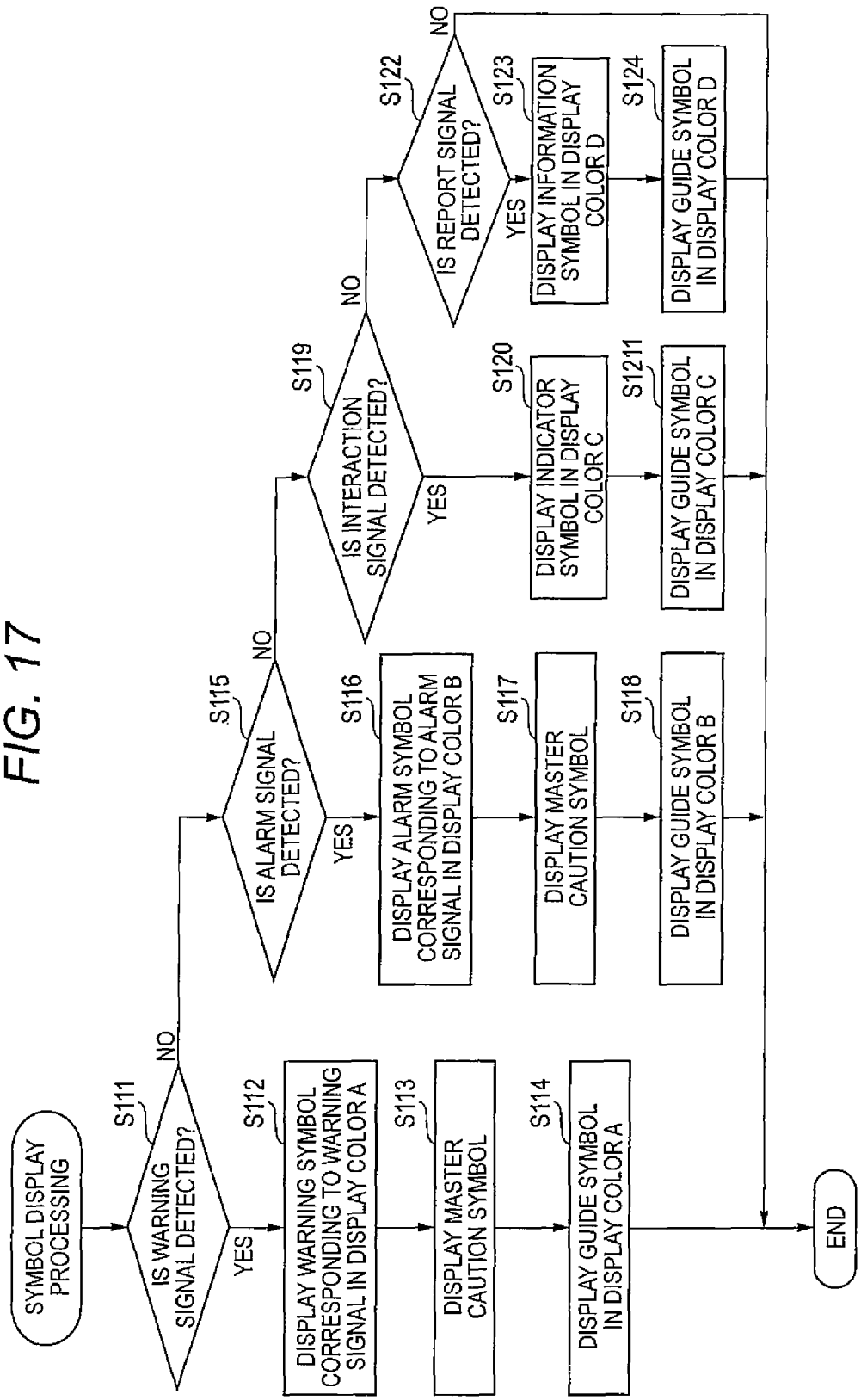
FIG. 17 is a flowchart of symbol display processing according to the third embodiment of the invention.

Next, a third embodiment of the invention will be discussed with reference to FIGS. 16 and 17. FIG. 16 is a drawing to show an on-vehicle display device 1 according to the third embodiment of the invention. FIG. 17 is a flowchart of symbol display processing according to the third embodiment of the invention.

The on-vehicle display device 1 according to the third embodiment has a roughly similar configuration to that of the on-vehicle display device 1 according to the first embodiment of the invention and therefore the similar configuration will not be discussed again. Components similar to those of the on-vehicle display device 1 according to the first embodiment are denoted by the same reference numerals for description.

As shown in FIG. 16, the first display 10 is provided in an area A in a width of a steering wheel 90 viewed from the driver, and the second display 30 is provided in an area B outside the width of the steering wheel 90 viewed from the driver. That is, the second display 30 is provided above the position where the first display 10 is provided (front glass side) and extending in an outside direction from an area C surrounded by the outer periphery of the steering wheel 90.

Thus, the second display 30 is provided in the area B outside the width of the steering wheel 90, whereby an image displayed on the second display 30 is not hidden in the steering wheel 90 and the visibility of the second display 30 can be enhanced.

The first display 10 and the second display 30 have an integral structure and one surface glass 20 is disposed on the fronts of the first display 10 and the second display 30. Thus, the first display 10 and the second display 30 are integrally configured, whereby an image can be displayed in operative association and cooperation between the first display 10 and the second display 30.

The second display 30 has an image display area 31 to display a menu screen for the driver, etc., to choose which of various screens of an information image corresponding to report information of an electronic control anomaly of an engine, an air bag system anomaly, a half shut state of a door, a seat belt wearing warning, etc., a back image of the vehicle, a navigation information screen, etc., and a guide image display area 33 for displaying a guide image 32 for guiding a driver's line of sight to the information image display area 31.

The guide image display area 33 has a plurality of guide lights 34 and displays the guide image 32 by lightening or blinking the guide lights 34. The guide lights 34 may be lit so that the guide image display area 33 becomes long step by step from the first display 10 side to the information image display area 31 side. Further, in the guide image display area 33, scroll lightening of lightening the guide lights 34 in order from the first display 10 side to the information image display area 31 side may be repeated.

Thus, the guide image 32 for guiding a driver's line of sight to the information image display area 31 of the second display 30 is displayed, so that the driver's line of sight is guided to the information image display area 31 and visibility of the information image (warning image, alarm image, interaction image, report image, etc.,) corresponding to report information displayed in the information image display area 31 can be enhanced.

An information image (see FIGS. 10A to 10D) corresponding to report information is displayed in the information image display area 31 of the second display 30, so that the description of a warning symbol 40, an alarm symbol 41, etc., displayed in a warning and alarm display part 15 of the first display 10 can be understood reliably.

Next, symbol display processing of the CPU 51 according to the third embodiment of the invention will be discussed with reference to FIG. 17. FIG. 17 is a flowchart of the symbol display processing according to the third embodiment of the invention.

As shown in FIG. 17, the CPU 51 determines whether or not a warning signal indicating the anomaly of the vehicle is detected based on a signal received in a CAN communication section 55 (step S111). When it is determined that the detected signal is a warning signal indicating an anomaly of the vehicle (YES at step S111), the CPU 51 displays the warning symbol 40 (see FIG. 16) corresponding to the warning signal in a display color A (step S112). That is, if the detected signal is a warning signal indicating an anomaly of the vehicle, the CPU 51 displays the warning symbol 40 corresponding to the warning signal in the display color A (for example, red) in the warning and alarm display part 15 (see FIG. 16).

Next, the CPU 51 displays a master caution symbol 42 (see FIG. 16) in a master caution display part 16 (step S113) and lightens or blinks the guide lights (see FIG. 16) in the guide image display area 33 in the display color A, thereby displaying the guide image 32 (step S114). When the processing terminates, the CPU 51 terminates the symbol display processing.

On the other hand, when it is determined that the detected signal is not a warning signal (NO at step S111), the CPU 51 determines whether or not an alarm signal indicating an anomaly of the vehicle is detected based on the signal received in the CAN communication section 55 (step S115). When it is determined that the detected signal is an alarm signal indicating an anomaly of the vehicle (YES at step S115), the CPU 51 displays the alarm symbol 41 (FIG. 10B) corresponding to the alarm signal in a display color B (step S116). That is, if the detected signal is an alarm signal indicating an anomaly of the vehicle, the CPU 51 displays the alarm symbol 41 corresponding to the received alarm signal in the display color B (for example, orange) in the warning and alarm display part 15 (see FIG. 16).

Next, the CPU 51 displays the master caution symbol 42 (see FIG. 16) in the master caution display part 16 (step S117) and lightens or blinks the guide lights (see FIG. 16) in the guide image display area 33 in the display color A, thereby displaying the guide image 32 (step S118). When the processing terminates, the CPU 51 terminates the symbol display processing.

On the other hand, when it is determined that the detected signal is not an alarm signal (NO at step S115), the CPU 51 determines whether or not an interaction signal indicating maintenance of the vehicle, etc., based on the signal received in the CAN communication section 55 (step S119). When it is determined that the detected signal is an interaction signal indicating maintenance of the vehicle, etc., (YES at step S119), the CPU 51 displays an indicator symbol (not shown) corresponding to the interaction signal in a display color C (step S120). That is, if the detected signal is an interaction signal reporting maintenance information, etc., to the driver, the CPU 51 displays the indicator symbol corresponding to the detected interaction signal in the display color C (for example, green) in the indicator information display part 17 (see FIG. 16).

Next, the CPU 51 lightens or blinks the guide lights (see FIG. 16) in the guide image display area 33 in the display color C, thereby displaying the guide image 32 (step S121). When the processing terminates, the CPU 51 terminates the symbol display processing.

On the other hand, when it is determined that the detected signal is not an interaction signal (NO at step S119), the CPU 51 determines whether or not a report signal indicating information of the vehicle, etc., based on the signal received in the CAN communication section 55 (step S122). When detecting that the detected signal is not a report signal (NO at step S122), the CPU 51 terminates the symbol display processing.

On the other hand, when it is determined that the detected signal is a report signal indicating information of the vehicle, etc., (YES at step S122), the CPU 51 displays an information symbol 43 (see FIG. 16) in a display color D (step S123). That is, if the detected signal is a report signal for reporting information of the vehicle, etc., to the driver, the CPU 51 displays the information symbol 43 (see FIG. 16) corresponding to the detected report signal in the display color D (for example, blue) in the indicator information display part 17 (see FIG. 16).

Next, the CPU 51 lightens or blinks the guide lights (see FIG. 16) in the guide image display area 33 in the display color D, thereby displaying the guide image 32 (step S123). When the processing terminates, the CPU 51 terminates the symbol display processing.

Thus, when the report information (symbol 40, 41, 43) on the first display 10, the guide image display area 33 (see FIG. 16) is lit in the display color corresponding to the displayed report information. Thus, if a driver's line of sight is forward during driving, the display color of the guide image display area 33 comes within sight of the driver and if information is important report information, the driver's line of sight can be induced to the information image display area.

The guide image display area 33 lit in the display color corresponding to the report information comes within sight of the driver, whereby the driver can recognize the report description without moving his or her line of sight to the first display 10. Therefore, it is made possible to decrease the number of times the driver's line of sight moves and recognize the description of the report information.

Thus, the on-vehicle display device 1 according to the embodiment of the invention includes the first display 10 provided in the area A in the width of the steering wheel viewed from the driver for displaying at least one piece of report information concerning the state of the vehicle (for example, the warning symbol 40, the alarm symbol 41, the master caution symbol 42, the indicator symbol (not shown), the information symbol 43 of the description of warning, preposition, vehicle information, interaction), the second display 30 for displaying an image in the area B outside the width of the steering wheel viewed from the driver, and the CPU 51 of the control circuit 50 for controlling display of an image on the first display 10 and the second display 30. When displaying one piece of report information on the first display, the CPU 51 of the control circuit 50 displays the information image corresponding to the piece of the report information (warning image, alarm image, interaction image, report image, etc.,) on the second display 30.

In the on-vehicle display device 1 according to the embodiment of the invention, the display time for displaying an information image is associated with each type of report information and when displaying one piece of report information on the first display 10, the CPU 51 of the control circuit 50 displays the information image corresponding to the type of piece of report information on the second display 30 until the expiration of the display time corresponding to the piece of the report information.

Further, in the on-vehicle display device 1 according to the embodiment of the invention, when displaying one piece of report information on the first display 10, the CPU 51 of the control circuit 50 scales up the information image data corresponding to the type of piece of report information and displays the information image corresponding to the scaled-up information image data on the second display 30 until the expiration of a predetermined time.

Predetermined times are associated with different types of report information in a one-to-one correspondence and when displaying one piece of report information on the first display 10, the CPU 51 of the control circuit 50 displays the information image corresponding to the scaled-up information image on the second display 30 until the expiration of the predetermined time corresponding to the piece of report information.

Further, in the on-vehicle display device 1 according to the embodiment of the invention, different display colors are associated with different types of report information in a one-to-one correspondence and when displaying one piece of report information on the first display 10, the CPU 51 of the control circuit 50 displays the information image corresponding to the piece of report information on the second display 30 and displays the background of the information image in the display color corresponding to the piece of report information.

In the on-vehicle display device 1 according to the embodiment of the invention, when not displaying report information on the first display 10, the CPU 51 of the control circuit 50 displays the icon images 72a to 72d on the second display 30 and the on-vehicle display device 1 further has the direction switch 81 for recognizing one of the icon images 72a to 72d and the determination switch 82 for selecting the recognized icon image. Different display colors are associated with the icon images 72a to 72d in a one-to-one correspondence and when one of the icon images 72a to 72d is recognized by operating the direction switch 81, the CPU 51 of the control circuit 50 displays the background of the icon images 72a to 72d displayed on the second display 30 in the display color corresponding to the recognized icon image.

Further, in the on-vehicle display device 1 according to the embodiment of the invention, when not displaying report information on the first display 10, the CPU 51 of the control circuit 50 displays the icon images 72a to 72d on the second display 30 and the on-vehicle display device 1 further has the direction switch 81 for recognizing one of the icon images 72a to 72d and the determination switch 82 for selecting the recognized icon image. Different moving images are associated with the icon images 72a to 72d in a one-to-one correspondence and when one of the icon images 72a to 72d is recognized by operating the direction switch 81, the CPU 51 of the control circuit 50 displays the moving image corresponding to the recognized icon image in the moving image display area 74a to 74b provided on the periphery of the recognized one of the icon images 72a to 72d displayed on the second display 30.

In the on-vehicle display device 1 according to the embodiment of the invention, the first display 10 and the second display 30 are formed in one body and the second display 30 has the information image display area 31 for displaying an information image or the icon images 72a to 72d and the guide image display area 33 provided between the first display 10 and the information image display area 31 for displaying the guide image 32 for guiding the driver's line of sight to the information image display area 31.

While the on-vehicle display device of the invention has been described based on the embodiments shown in the accompanying drawings, but the invention is not limited to the embodiments and the configurations of the sections and the parts may be replaced with any configurations having similar functions.

For example, in the first embodiment described above, the image information (warning image, alarm image, interaction image, report image) is scaled up for display for the predetermined time in response to the warning signal, the alarm signal, the interaction signal, the report signal, but the information image (warning image or alarm image) may be scaled up for display only for the warning signal or the alarm signal.

In the first embodiment described above, the background of the information image display area 31 is displayed in the display color corresponding to each color in response to the warning signal, the alarm signal, the interaction signal, the report signal, but the background of the information image display area 31 may be displayed in the display color corresponding to the warning signal or the alarm signal only for the warning signal or the alarm signal.

Further, in the third embodiment described above, the guide image display area 33 (see FIG. 16) is lit in the display color corresponding to the report information (symbol 40, 41, 43) displayed on the first display 10. However, the guide image display area 33 may be lit for the warning signal or the alarm signal; otherwise, the guide image display area 33 may be blinked or extinguished. The guide image display area 33 may be blinked for a warning or an alarm; otherwise, the guide image display area 33 may be lit or extinguished.

In the third embodiment described above, the guide light 34 in the guide image display area 33 is lit or blinked in the display color corresponding to the report information (symbol 40, 41, 43), thereby displaying the guide image 32, but image data of the display color corresponding to the report information may be generated and displayed.

Further, in the embodiments described above, the report information (symbol 40, 41, 43) is displayed on the first display 10 in response to the detected warning signal, alarm signal, interaction signal, report signal. However, if the detected signal is the interaction signal or the report signal, an interaction image and a report image may be displayed in the image display area 31 of the second display 30 without displaying the indicator symbol or the information symbol 43 on the first display 10.

The present application is based on Japanese Patent Application No. 2010-123090 filed on May 28, 2010, the contents of which are incorporated herein by reference.

Industrial Applicability

The invention is extremely useful for decreasing the number of times a driver's line of sight moves and enhancing recognition of the description of the report information.

Reference Signs List
1 Vehicle display device
10 First display
11 Speed meter
12 Tachometer
13 Direction indication part
14 Shift position display part
15 Warning and alarm display part
16 Master caution display part
17 Indicator information display part
18 Warning LED
20 Surface glass
21 LCD
22 Lightening LED
23 Lightening LED
30 Second display
31 Information image display area
32 Guide image
33 Guide image display area
34 Guide light
37 Guide light LED
40 Warning symbol
41 Alarm symbol
42 Master caution symbol
43 Information symbol
50 Control circuit
51 CPU
52 ROM
53 RAM
55 CAN communication section
57 DEC

The invention claimed is:

1. An on-vehicle display device comprising:
a first display section provided in an area within a width of a steering wheel of a vehicle viewed from a driver sitting on a driver seat of the vehicle and which displays at least one piece of report information concerning a state of the vehicle;
a second display section provided in an area outside the width of the steering wheel viewed from the driver and which displays an image; and
a control section which controls the displays of the first display section and the second display section respectively,
wherein when a piece of report information is displayed on the first display section, the control section controls to display an information image corresponding to the piece of report information on the second display section,
wherein when no report information is displayed on the first display section, the control section controls to display a plurality of icon images on the second display section;
the on-vehicle display device further comprising:
a cursor key for recognizing one of the plurality of icon images; and
a selection key for selecting the recognized icon image,
wherein different display colors are associated with the plurality of icon images respectively; and
wherein when the one of the icon images is recognized by receiving a signal from the cursor key, the control section controls to display a background of the plurality of icon images in a menu screen on the second display section in the display color corresponding to the recognized icon image.

2. An on-vehicle display device comprising:
a first display section provided in an area within a width of a steering wheel of a vehicle viewed from a driver sitting on a driver seat of the vehicle and which displays at least one piece of report information concerning a state of the vehicle;
a second display section provided in an area outside the width of the steering wheel viewed from the driver and which displays an image; and
a control section which controls the displays of the first display section and the second display section respectively,
wherein when a piece of report information is displayed on the first display section, the control section controls to display an information image corresponding to the piece of report information on the second display section,
wherein no report information is displayed on the first display section, the image display control section controls to display a plurality of icon images on the second display section;

the on-vehicle display device further comprising:

a cursor key for recognizing one of the plurality of icon images; and a selection key for selecting the recognized icon image, wherein different moving images are associated with the plurality of icon images respectively; and wherein when the one of the icon images is recognized by receiving a signal from the cursor key, the control section controls to display the moving image associated with the recognized icon image on a moving image display area provided on the periphery of the recognized one of the icon images.

3. An on vehicle display device comprising:

a first display section provided in an area within a width of a steering wheel of a vehicle viewed from a driver sitting on a driver seat of the vehicle and which displays at least one piece of report information concerning a state of the vehicle;

a second display section provided in an area outside the width of the steering wheel viewed from the driver and which displays an image; and a control section which controls the displays of the first display section and the second display section respectively, wherein when a piece of report information is displayed on the first display section, the control section controls to display an information image corresponding to the piece of report information on the second display section, wherein the first display section and the second display section are integrally formed in one body; and wherein the second display section has an image display area for displaying the information image or icon images and a guide display area provided between the first display section and the image display area for displaying a guide image for guiding a driver's line of sight to the image display area of the second display section.

* * * * *